US011516853B2

(12) United States Patent
Freda et al.

(10) Patent No.: US 11,516,853 B2
(45) Date of Patent: Nov. 29, 2022

(54) RANDOM ACCESS IN NEXT GENERATION WIRELESS SYSTEMS

(71) Applicant: Sony Corporation, Tokyo (JP)

(72) Inventors: Martino Freda, Montreal (CA); Ghyslain Pelletier, Montreal (CA); Paul Marinier, Montreal (CA); Tao Deng, South Melville, NY (US); J. Patrick Tooher, Montreal (CA)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 17/126,042

(22) Filed: Dec. 18, 2020

(65) Prior Publication Data
US 2021/0105833 A1 Apr. 8, 2021

Related U.S. Application Data

(63) Continuation of application No. 16/314,666, filed as application No. PCT/US2017/054073 on Sep. 28, 2017, now Pat. No. 10,873,975.
(Continued)

(51) Int. Cl.
H04W 74/08 (2009.01)
H04L 5/00 (2006.01)
H04W 72/14 (2009.01)

(52) U.S. Cl.
CPC ....... H04W 74/0833 (2013.01); H04L 5/0055 (2013.01); H04W 72/14 (2013.01)

(58) Field of Classification Search
CPC .. H04W 74/0833; H04W 72/14; H04L 5/0055
See application file for complete search history.

(56) References Cited

FOREIGN PATENT DOCUMENTS

CN 103650620 A 3/2014
CN 103858478 A 6/2014
(Continued)

OTHER PUBLICATIONS

NTT Docomo et al.: "Design for RACH Procedure for NR", 3GPP Draft; R1-167378 RACH Procedure for NR, 3rd Generation Partnership Project (3GPP), Mobil Competence Centre; 650, Route Des Lucioles; F-06921 Sophia-Antipolis Cedex; France, vol. RAN WG1, No. Goteborg; Aug. 22, 2016-Aug. 26, 2016, Aug. 21, 2016 (Aug. 21, 2016), XP051.*
(Continued)

Primary Examiner — Brenda H Pham
(74) Attorney, Agent, or Firm — Xsensus LLP

(57) ABSTRACT

A wireless transmit/receive unit (WTRU) may initiate a random access. The WTRU may determine whether to select a first random access channel (RACH) procedure or a second RACH procedure for the random access. The first RACH procedure may be a legacy RACH procedure. The second RACH procedure may be an enhanced RACH (eR-ACH) procedure. The WTRU may determine whether to select the first RACH procedure or the second RACH procedure based at least on a type of uplink data to be transmitted. When the second RACH procedure is selected, the WTRU may determine at least one physical random access channel (PRACH) resource associated with the second RACH procedure. The WTRU may determine a preamble sequence associated with the second RACH procedure. The WTRU may determine a data resource for the uplink data. The WTRU may send a RACH transmission that includes the preamble sequence and the uplink data.

20 Claims, 11 Drawing Sheets

Related U.S. Application Data

(60) Provisional application No. 62/474,762, filed on Mar. 22, 2017, provisional application No. 62/416,237, filed on Nov. 2, 2016, provisional application No. 62/401,082, filed on Sep. 28, 2016.

(56) References Cited

FOREIGN PATENT DOCUMENTS

| | | |
|---|---|---|
| CN | 104919885 A | 9/2015 |
| JP | 2013520103 A | 5/2013 |
| JP | 2019510407 A | 4/2019 |
| KR | 20150035994 A | 4/2015 |
| KR | 20150115685 A | 10/2015 |
| WO | WO-2015129985 A1 | 9/2015 |
| WO | WO-2017147550 A1 | 8/2017 |

OTHER PUBLICATIONS

Qualcomm Incorporated: "Random Access Channel Design", 3GPP Draft; R1-160883, Random Access Channel Design, 3rd Generation Partnership Project (3GPP), Mobile Competence Centre, 650, Route Des Lucioles; F-06921 Sophia-Antipolis Cedex: France.*

Nokia, Alcatel—Lucent Shanghai Bell, Random access principles for new radio[online], 3GPP TSG—RAN WG1#86b R1-1609737, Internet <URL:http://www.3gpp.org/ftp/tsg_ran/WG1_RL1/TSGR1_86b/Docs/R1—Oct. 14, 2015 1609737.zip>, Oct. 14, 2016.

On 2—step Random access procedure, ZTE Corporation, ZTE Microelectronics[online], 3GPP TSG—RAN WG1#86b R1-1608969, Internet <Oct. 14,, the Internet <URL: https://www.3gpp.org/ftp/tsg_ran/WG1_RL1/TSGR1_86b/Docs/R1 / 1608969.zip>, Oct. 14, 2016.

NTT Docomo, Inc., "Design for RACH Procedure for NR," 3GPP TSG RAN WG1 Meeting #86, R1-167378, Sweden Aug. 22-26, 2016, pp. 4.

LG Electronics, "Overall discussion on URLLC," 3GPP TSG RAN WG1 Meeting #86, R1-166882, Sweden, Aug. 22-26, 2016, pp. 5.

LG Electronics, "Discussion on PRACH preamble design and RACH procedure for NR," 3GPP TSG RAN WG1 Meeting #86, R1-166911, Sweden Aug. 22-26, 2016, pp. 7.

Qualcomm Incorporated,"Random Access Channel Design," 3GPP TSG RAN WG1 Meeting #84, R1-160883, Malta Feb. 15-19, 2016, pp. 4.

MediaTek Inc., "Initial Access for NR," 3GPP TSG-RAN WG2 #94, R2-163893, China, May 23-27, 2016, pp. 6.

InterDigital Communications, "2-step random access procedure," 3GPP TSG RAN WG1 AH_NR Meeting , R1-1700703, Spokane, USA, Jan. 16-20, 2017, pp. 4.

International Search Report and Written Opinion for International Applicaiton No. PCT/US2017/054073, dated Dec. 21, 2017.

Ericsson, "On the random access procedure", 3GPP TSG-RAN WG1 #86, R1-167059, Aug. 22-26, 2016, total 4 pages, Gothenburg, Sweden.

* cited by examiner

RANDOM ACCESS IN NEXT GENERATION WIRELESS SYSTEMS

CROSS-REFERENCE TO RELATED APPLICATIONS

This application is a continuation of U.S. application Ser. No. 16/314,666, filed Jan. 1, 2019, which is based on PCT filing PCT/US2017/054073, filed Sep. 28, 2017, which claims priority to U.S. provisional patent application No. 62/401,082, filed Sep. 28, 2016, U.S. provisional patent application No. 62/416,237, filed Nov. 2, 2016, and U.S. provisional patent application No. 62/474,762, filed Mar. 22, 2017, which are incorporated herein by reference in their entirety.

BACKGROUND

Mobile communications continue to evolve. A fifth generation may be referred to as 5G. A previous (legacy) generation of mobile communication may be, for example, fourth generation (4G) long term evolution (LTE).

SUMMARY

Systems, methods, and instrumentalities (e.g. in a wireless transmit/receive unit (WTRU) and/or network layers L1, L2, L3) are disclosed for random access in next generation wireless systems. A WTRU may initiate a random access request. The WTRU may initiate the random access request to perform a scheduling request and/or transmit an amount of data that is below a predetermined threshold. The WTRU may determine whether to select a first random access channel (RACH) procedure or a second RACH procedure for the random access. The first RACH procedure may be a legacy RACH procedure. The second RACH procedure may be an enhanced RACH (eRACH) procedure. The WTRU may determine whether to select the first RACH procedure or the second RACH procedure based on a type of uplink data to be transmitted and/or the purpose of the random access request.

When the second RACH procedure is selected, the WTRU may determine at least one physical random access channel (PRACH) resource associated with the second RACH procedure. The PRACH resource may be an enhanced PRACH resource. The PRACH resource may include one or more of the preamble sequence, a time-frequency resource, and/or a numerology. The WTRU may determine a preamble sequence associated with the second RACH procedure. The preamble sequence may be determined based on one or more of the at least one PRACH resource, a data reception reliability, an amount of data to be transmitted, a maximum transport block size, a range of allowable transport block sizes, a type of the RACH transmission, a trigger associated with the RACH transmission, a timing requirement, a buffer status, a WTRU identity, a location, a numerology, a modulation and coding scheme (MCS), a demodulation configuration, and/or multiple preambles received from the network device.

The WTRU may determine a data resource for the uplink data based on one or more of the at least one PRACH resource, the preamble sequence, the type of uplink data, or a size of the uplink data. The data resource may be determined from a set of available resources. The set of available resources may be indicated via one or more of system information, an access table, or a physical data control channel (PDCCH) grant to a specific radio network identifier (RNTI). The WTRU may send a RACH transmission to a network device using the at least one PRACH resource and/or the data resource. The RACH transmission may include the preamble sequence and/or the uplink data. The preamble sequence and the uplink data may be disjoint in time and/or frequency. The preamble sequence may be prepended to the uplink data. The WTRU may receive a random access response (RAR) message that includes an acknowledgment (ACK) or a negative acknowledgment (NACK) associated with the uplink data in the RACH transmission. The RAR message may include an uplink grant. The WTRU may transmit additional pending uplink data, control information, and/or state transition information to the network device based on the uplink grant.

DETAILED DESCRIPTION

A detailed description of illustrative embodiments will now be described with reference to the various Figures. Although this description provides a detailed example of possible implementations, it should be noted that the details are intended to be exemplary and in no way limit the scope of the application.

Figure 1A:
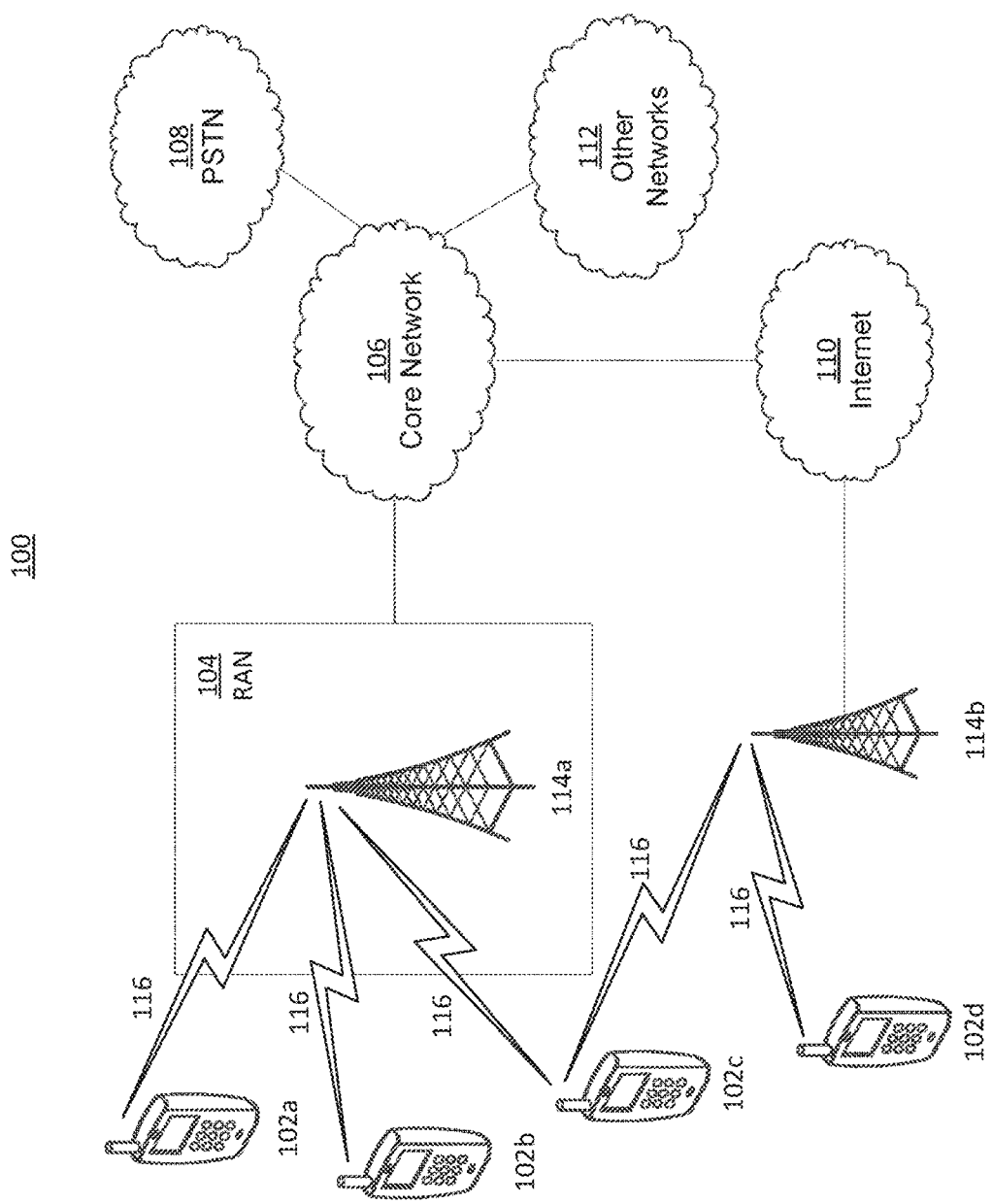
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro):

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (I5-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
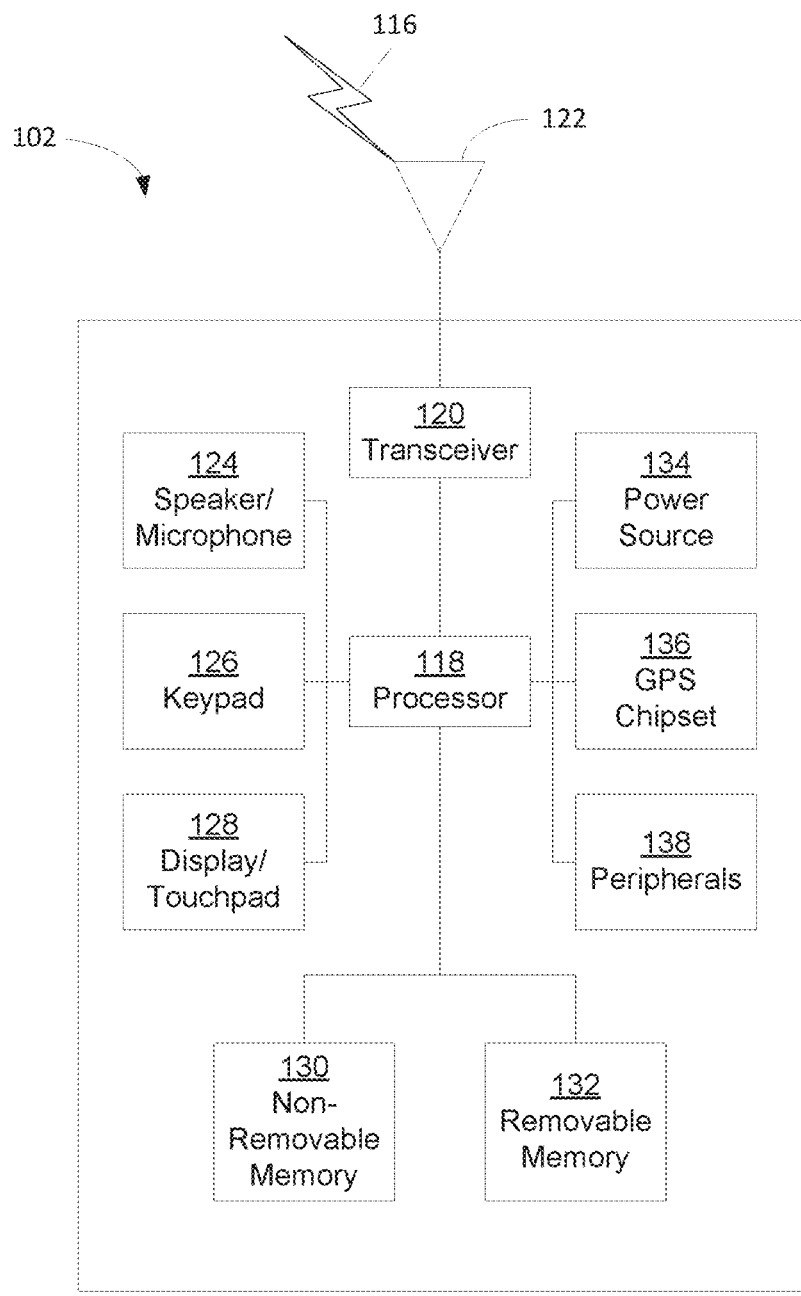
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the downlink (e.g., for reception)).

Figure 1C:
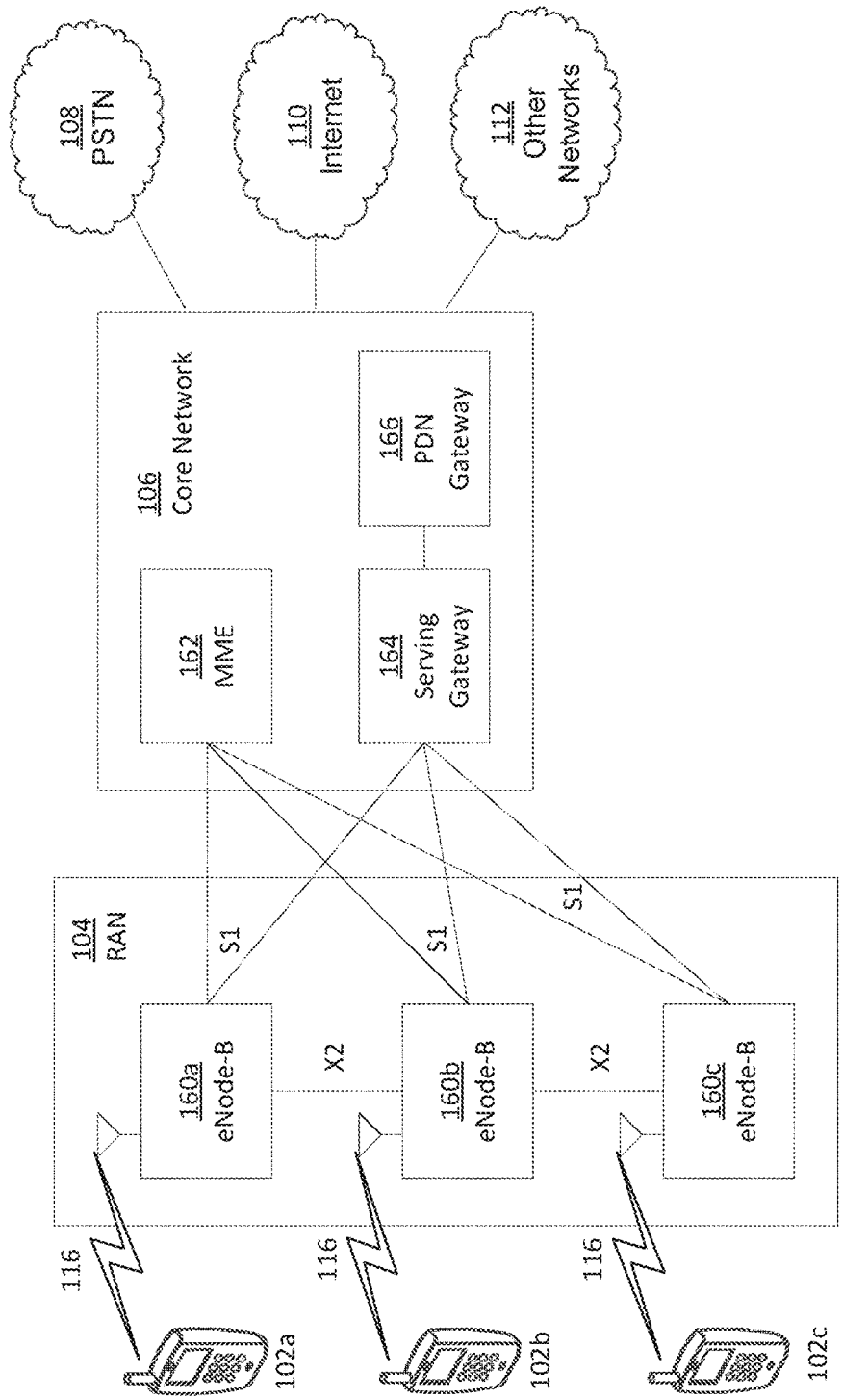
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the aft interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the BSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
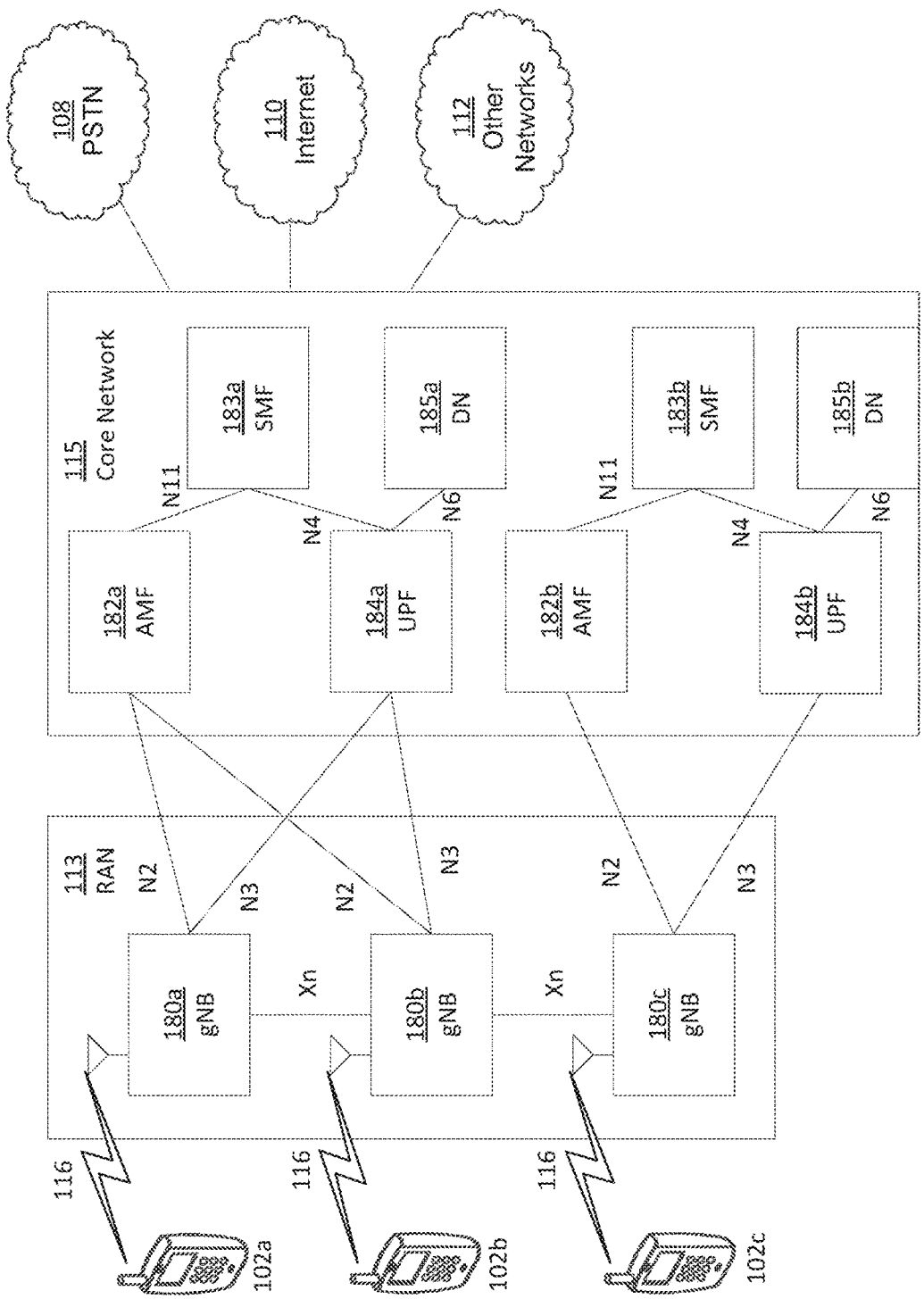
FIG. 1D is a system diagram illustrating a further example RAN and a further example CN that may be used within the communications system illustrated in FIG. 1A according to an embodiment

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

A 5G (e.g., 5G Flex) air interface may support a variety of use cases, such as one or more of the following: (i) improved broadband (IBB) performance; (ii) industrial control and communications (ICC) and vehicular applications (V2X) and (iii) massive machine-type communications (mMTC). The terms 5G interface or 5G Flex may be used herein to refer to an air interface used to provide next generation radio access. The terms 5G interface or 5G Flex may be a relatively dynamic interface based on the varying use of different numerologies to support different types of transmissions. An example of transmissions parameters that may be varied for different numerologies may include one or more of a subcarrier spacing, a symbol (e.g., OFDM symbol) length, a transmission time interval (TTI) length, a waveform type, and/or the like. The term New Radio (NR) may also be used to refer to a 5G interface or 5G Flex.

A 5G interface may provide support for ultra-low transmission latency (LLC). Air interface latency may be, for example, 1 ms round trip time (RTT). TTIs may be, for example, between 100 us and 250 us. Support may be provided for ultra-low access latency (e.g., time from initial system access until completion of transmission of a first user plane data unit). End-to-end (e2e) latency (e.g., of less than 10 ms) may be supported for IC and V2X.

A 5G interface may provide support for ultra-reliable transmission (URC). Support for URC may comprise, for example, a transmission success and service availability (e.g., 99.999% or a Packet Loss Ratio less than 10e-6) and/or a speed mobility range (e.g., 0-500 km/h). A packet loss ratio (e.g. less than $10e^{-6}$) may be supported for IC and V2X.

A 5G interface may provide support for MTC operation. Support for Machine-Type Communications (MTC) operation may comprise, for example, air interface support for narrowband operation (e.g., less than 200 KHz), extended battery life (e.g. 15 years of autonomy) and/or minimal communication overhead for small and infrequent data transmissions (e.g., low data rate such as 1-100 kbps with access latency of seconds to hours).

Orthogonal Frequency-Division Multiplexing (OFDM) may be used as a signal format for data transmissions, for example, in LTE and IEEE 802.11. OFDM may (e.g., efficiently) divide spectrum into multiple parallel orthogonal subbands. A (e.g., each) subcarrier may be shaped using a rectangular window in the time domain, which may lead to sine-shaped subcarriers in the frequency domain. Orthogonal Frequency Division Multiple Access (OFDMA) may be implemented with (e.g. perfect) frequency synchronization and (e.g. tight) management of uplink timing alignment within the duration of a cyclic prefix, for example, to maintain orthogonality between signals and to minimize intercarrier interference. Tight synchronization may be a challenge, for example, in a system where a WTRU may be simultaneously connected to multiple access points. Additional power reduction may be applied to uplink transmissions, e.g., to comply with spectral emission requirements in adjacent bands, which may occur in the presence of aggregation of fragmented spectrum for a WTRU's transmissions.

Some shortcomings of OFDM (e.g. cyclic prefix (CP)-OFDM) implementations may be addressed, for example, by applying more stringent RF requirements, such as when operating with a large contiguous spectrum without requiring aggregation. A CP-based OFDM transmission scheme may lead to a downlink physical layer for 5G similar to preceding generations, such as modifications to pilot signal density and location.

A 5gFLEX implementation may utilize OFDM or waveforms other than OFDM for 5G systems, e.g., for a downlink transmission scheme.

One or more principles that may be applicable to the design of flexible radio access for 5G are described herein, e.g., based on OFDMA and LTE systems. Examples provided herein may be applicable to other wireless systems and/or wireless technologies.

A 5gFLEX downlink transmission scheme may be based on a multicarrier waveform that may be characterized by high spectral containment (e.g. lower side lobes and lower Out-Of-Band (OOB) emissions). MC waveform candidates for 5G may include OFDM—Offset Quadrature Amplitude Modulation (OQAM) and universal filtered multi-carrier (UFMC) (e.g. UF-OFDM) among other waveforms. Examples provided herein may use OFDM-OQAM and UFMC (UF-OFDM), but subject matter (e.g. examples) may be applicable to other waveforms.

Multicarrier modulation waveforms may divide a channel into subchannels and may modulate data symbols on subcarriers in the subchannels.

A filter may be applied (e.g. in the time domain per subcarrier) to an OFDM signal, e.g., for OFDM-OQAM to reduce OOB. OFDM-OQAM may cause very low interference to adjacent bands. OFDM-OQAM may not need large guard bands. OFDM-OQAM may not require a cyclic prefix. OFDM-OQAM may be a Filtered Band Multi-Carrier (FBMC) technique. OFDM-OQAM may be sensitive to multipath effects and to high delay spread in terms of orthogonality, which may complicate equalization and channel estimation.

A filter may be applied (e.g. in the time domain per subband) to an OFDM signal, e.g., for UFMC (UF-OFDM) to reduce OOB. Filtering may be applied per subband, for example, to use spectrum fragments, e.g., to reduce complexity and improve practical implementation of UF-OFDM. There may be unused spectrum fragment in the band. OOB emissions in fragments may be high. UF-OFDM may provide an improvement over OFDM at the edges of the filtered spectrum with or without improvement in the spectral hole.

A waveform may enable multiplexing in frequency of signals with non-orthogonal characteristics (such as different subcarrier spacing) and co-existence of asynchronous signals, e.g., without requiring complex interference cancellation receivers. A waveform may facilitate aggregation of fragmented pieces of spectrum in baseband processing, for example, as a lower cost alternative to its implementation as part of RF processing.

Co-existence of different waveforms within the same band may be supported, for example, to support mMTC narrowband operation (e.g. using Single Carrier Multiple Access (SCMA)). Support may be provided for the combination of different waveforms (e.g. CP-OFDM, OFDM-OQAM and UF-OFDM) within the same band, e.g., for all aspects and/or for downlink and uplink transmissions. Co-existence may include transmissions using different types of waveforms between different WTRUs or transmissions from the same WTRU (e.g. simultaneously, with some overlap or consecutive transmission in the time domain).

Other co-existence aspects may include support for hybrid types of waveforms, such as waveforms and/or transmissions that support a potentially varying CP duration (e.g. from one transmission to another) a combination of a CP and a low power tail (e.g. a zero tail), a form of hybrid guard interval (e.g. using a low power CP) and/or an adaptive low power tail, etc. Hybrid types of waveforms may support dynamic variation and/or control of further aspects, such as how to apply filtering. Filtering may be applied at the edge of the spectrum used for reception of any transmission(s) for a given carrier frequency, at the edge of a spectrum used for reception of a transmission associated to a specific SOM, or per subband or per group thereof.

An uplink transmission scheme may use the same or a different waveform used for downlink transmissions.

Multiplexing transmissions to and from different WTRUs in the same cell may be based on frequency division multiple access (FDMA) and time division multiple access (TDMA).

5G Flexible Radio Access Technology (5gFLEX) radio access may be characterized, for example, as a very high degree of spectrum flexibility that enables deployment in different frequency bands with different characteristics, such as different duplex arrangements, different and/or variable sizes of available spectrum (e.g. whether contiguous and/or non-contiguous spectrum allocations in the same or different bands). 5gFLEX radio access may support variable timing aspects, such as support for multiple TTI lengths and/or support for asynchronous transmissions.

TDD and FDD duplexing schemes may be supported, e.g., in a duplexing arrangement. Supplemental downlink operation (e.g. for FDD operation) may be supported, for example, using spectrum aggregation. FDD operation may support full-duplex FDD and half-duplex FDD operation. Downlink (DL)/Uplink (UL) allocation (e.g. for TDD operation) may be dynamic (e.g. it may or may not be based on a fixed DL/UL frame configuration). The length of a DL or UL transmission interval may be set per transmission opportunity.

A characteristic of a 5G air interface may be to enable the use of different transmission bandwidths on uplink and downlink, which may, for example, range from a nominal system bandwidth to a maximum value corresponding to a system bandwidth.

Supported system bandwidths (e.g. for single carrier operation) may, for example, include 5, 10, 20, 40 and 80 MHz. Supported system bandwidths may be any bandwidth in a given range (e.g. from a few MHz to 160 MHz. Nominal bandwidths may have one or more fixed values. Narrowband transmissions (e.g. up to 200 KHz) may be supported within the operating bandwidth for MTC devices.

Figure 2:
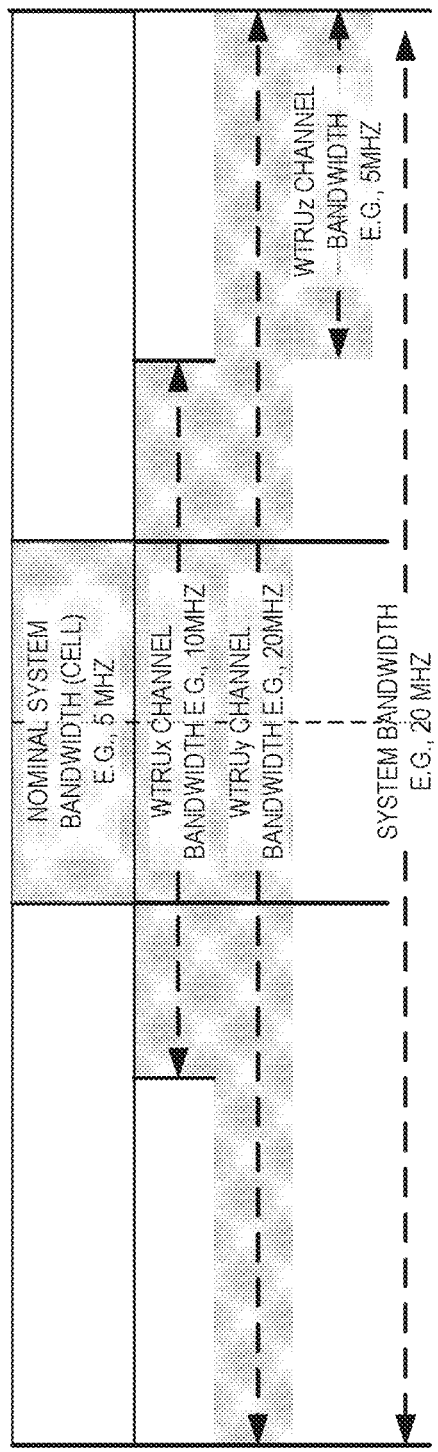
FIG. 2 is an example of transmission bandwidths.

FIG. 2 is an example of transmission bandwidths. System bandwidth may refer to the largest portion of spectrum that may be managed by a network for a given carrier. A portion that a WTRU minimally supports for cell acquisition, measurements and initial access to the network may correspond to nominal system bandwidth. A WTRU may be configured with a channel bandwidth, which may be within the range of the entire system bandwidth. A WTRU's configured channel bandwidth may or may not include the nominal part of the system bandwidth, e.g., as shown in FIG. 2.

Bandwidth flexibility may be achieved, for example, when all applicable RF requirements for a given maximum operating bandwidth in a band can be met without the introduction of additional allowed channel bandwidths for that operating band, e.g., due to the efficient support of baseband filtering of the frequency domain waveform.

Procedures may be provided to configure, reconfigure and/or dynamically change a WTRU's channel bandwidth for single carrier operation. Procedures may be provided to allocate spectrum for narrowband transmissions within a nominal system, system or configured channel bandwidth.

A physical layer of a 5G air interface may be band-agnostic and/or may support operation in licensed bands below 5 GHz and/or operation in unlicensed bands in the range 5-6 GHz. Listen-Before-Talk (LBT) Cat 4 based channel access framework, e.g., similar to LTE License Assisted Access (LAA), may be supported, for example, for operation in unlicensed bands.

Cell-specific and/or WTRU-specific channel bandwidths for arbitrary spectrum block sizes may be scaled and managed, for example, using scheduling, addressing of resources, broadcasted signals, measurements, etc.

Downlink control channels and signals may support FDM operation. A WTRU may acquire a downlink carrier, for example, by receiving transmissions using (e.g. only) the nominal part of the system bandwidth. For example, a WTRU may not initially be required to receive transmissions covering the entire bandwidth that may be managed by the network for the concerned carrier.

Downlink data channels may be allocated over a bandwidth that may or may not correspond to a nominal system bandwidth, for example, without restrictions other than being within the WTRU's configured channel bandwidth. For example, a network may operate a carrier with a 12 MHz system bandwidth using a 5 MHz nominal bandwidth, allowing devices supporting (e.g. at most) 5 MHz maximum RF bandwidth to acquire and access the system while (e.g. potentially) allocating +10 to −10 MHz of a carrier frequency to other WTRU's supporting (e.g. up to) 20 MHz worth of channel bandwidth.

Figure 3:
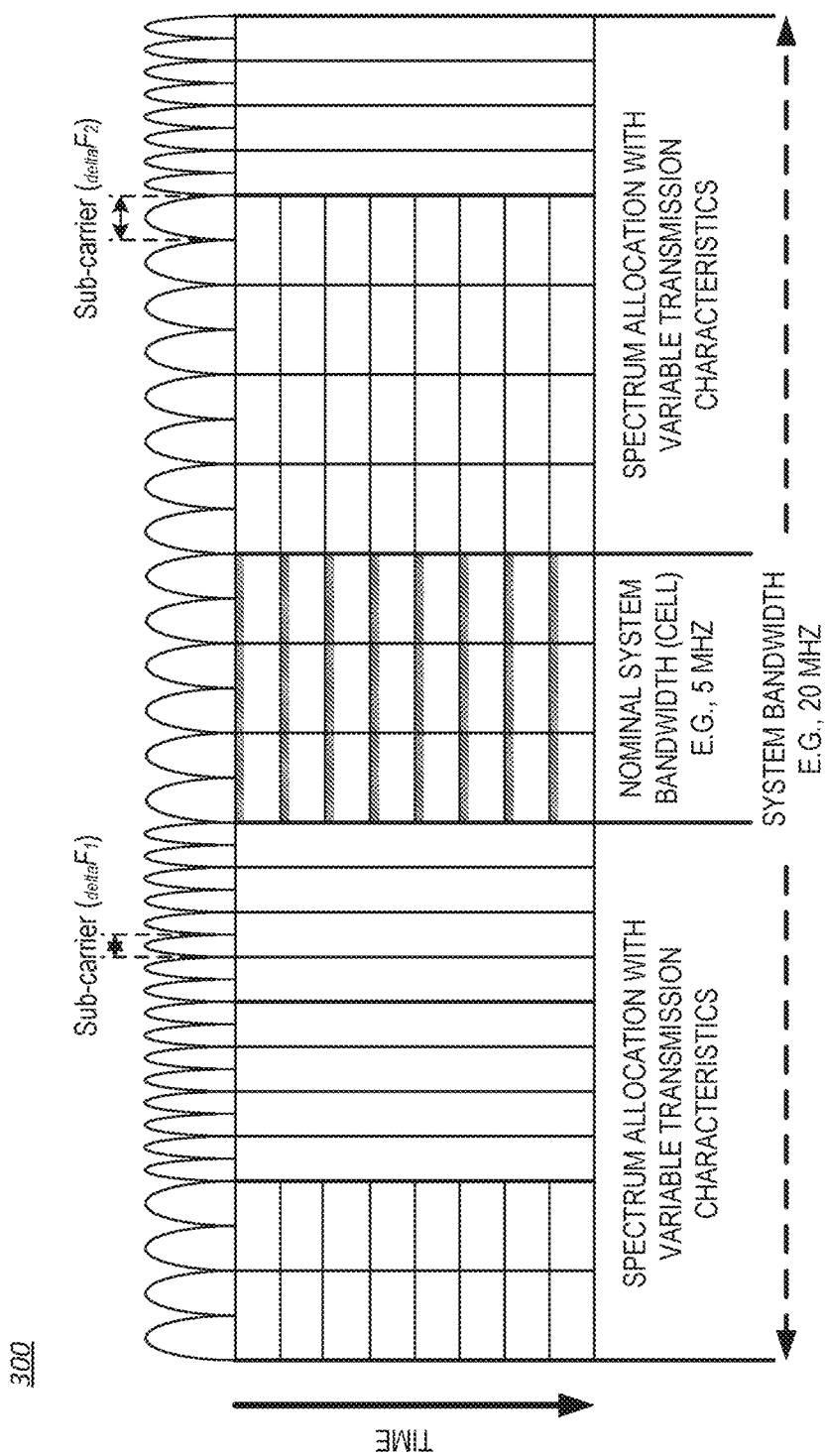
FIG. 3 is an example of spectrum allocation where different subcarriers may be assigned to different modes of operation.

FIG. 3 is an example of spectrum allocation 300 where different subcarriers may be (e.g. at least conceptually) assigned to different modes of operation (e.g. spectrum operation mode (SOM)). Different SOMs may be used, for example, to fulfill different requirements for different transmissions. A SOM may, for example, consist of a subcarrier spacing, a TTI length and/or one or more reliability aspects (e.g. HARQ processing aspects), a secondary control channel, etc. A SOM may be used to refer to a (e.g. specific) waveform or may be related to a processing aspect (e.g. in support of co-existence of different waveforms in the same carrier using Frequency Division Multiplexing (FDM) and/or Time Division Multiplexing (TDM)). A SOM may be used, for example, when coexistence of Frequency Division Duplexing (FDD) operation in a Time Division Duplexing (TDD) band may be supported (e.g. in a TDM manner or similar manner).

A WTRU may be configured to perform transmissions according to one or more SOMs. For example, a SOM may correspond to transmissions that use one or more of (i) a (e.g. specific) TTI duration, (ii) an initial power level, (iii) a HARQ processing type, (iv) an upper bound for successful HARQ reception/transmission, (v) a transmission mode, (vi) a physical channel (uplink or downlink), (vii) an operating frequency, band or carrier, (viii) a specific waveform type or transmission according to a RAT (e.g. for 5G or previous generation LTE). A SOM may correspond to a QoS level and/or related aspect (e.g. maximum/target latency, maximum/target Block Error Rate (BLER) or similar). A SOM may correspond to a spectrum area and/or to a control channel or aspect thereof (e.g. search space, Downlink Control Information (DCI) type). For example, a WTRU may be configured with a SOM for (e.g. each of) an Ultra-Reliable Communications (URC) type of service, a Low Latency Communication (LLC) type of service and/or a Massive Broadband Communications (MBB) type of service. A WTRU may have a configuration for a SOM for system access and/or for transmission/reception of layer 3

(L3) control signaling (e.g. RRC), such as in a portion of a spectrum associated with the system (e.g. nominal system bandwidth).

Spectrum aggregation may be supported, for example, where a WTRU supports transmission and reception of multiple transport blocks over contiguous or non-contiguous sets of physical resource blocks (PRBs) within the same operating band (e.g. for single carrier operation). Mapping a single transport block to separate sets of PRBs may be supported. Support may be provided for simultaneous transmissions associated with different SOM requirements.

Support may be provided for multicarrier operation, e.g., using contiguous or non-contiguous spectrum blocks within the same operating band or across two or more operating bands. Support may be provided for aggregation of spectrum blocks using different modes (e.g. FDD and TDD) and using different channel access methods (e.g. licensed and unlicensed band operation below 6 GHz). Support may be provided for procedures that configure, reconfigure and/or dynamically change a WTRU's multicarrier aggregation.

Downlink and uplink transmissions may be organized into radio frames characterized by a number of fixed aspects (e.g. location of downlink control information) and a number of varying aspects (e.g. transmission timing, supported types of transmissions).

A basic time interval (BTI) may be expressed in terms of an integer number of one or more symbol(s), which symbol duration may be a function of the subcarrier spacing applicable to the time-frequency resource. Subcarrier spacing (e.g. for an FDD frame) may differ between the uplink carrier frequency $f_{UL}$ and the downlink carrier frequency $f_{DL}$.

A transmission time interval (TTI) may be a minimum time supported by a system between consecutive transmissions, for example, where each may be associated with a different transport block (TB) for the downlink ($TTI_{DL}$) and the uplink (UL transceiver (TRx)), e.g., excluding any applicable preamble and including any control information (e.g. downlink control information (DCI) for downlink or uplink control information (UCI) for uplink). A TTI may be expressed in terms of an integer number of one of more BTIs. A BTI may be specific to and/or associated with a given SOM.

Frame duration support may, for example, include 100 us, 125 us (⅛ ms), 142.85 us (1/7 ms may be 2 nCP LTE OFDM symbols) and 1 ms, e.g., to enable alignment of timing structures for one or more generations, such as 5G and one or more previous generations of LTE.

A frame may start with downlink control information (DCI) of a fixed time duration $t_{dci}$ preceding a downlink data transmission (DL TRx) for a concerned carrier frequency— $f_{UL+DL}$ for TDD and $f_{DL}$ for FDD.

A frame may consist of a downlink portion (e.g. DCI and DL TRx) and (e.g. optionally) an uplink portion (e.g. UL TRx), for example, for FDD duplexing. A switching gap (swg) may (e.g. always) precede the uplink portion of the frame, e.g., when present.

A frame may consist of a downlink reference TTI and one or more TTI(s) for the uplink, e.g., for FDD duplexing. The start of an uplink TTI may be (e.g. always) derived using an offset ($t_{offset}$), which may be applied from the start of the downlink reference frame that overlaps with the start of the uplink frame.

5gFLEX (e.g. for TDD) may support D2D/V2x/Sidelink operation in a frame, for example, by including respective downlink control and forward direction transmission in the DCI+DL TRx portion (e.g. when a semi-static allocation of the respective resources may be used) or in the DL TRx portion (e.g. for dynamic allocation) and/or by including the respective reverse direction transmission in the UL TRx portion.

5gFLEX (e.g. for FDD) may support D2D/V2x/Sidelink operation in a UL TRx portion of a frame, for example, by including respective downlink control, forward direction and reverse direction transmissions in the UL TRx portion (e.g. dynamic allocation of the respective resources may be used).

Figure 4:
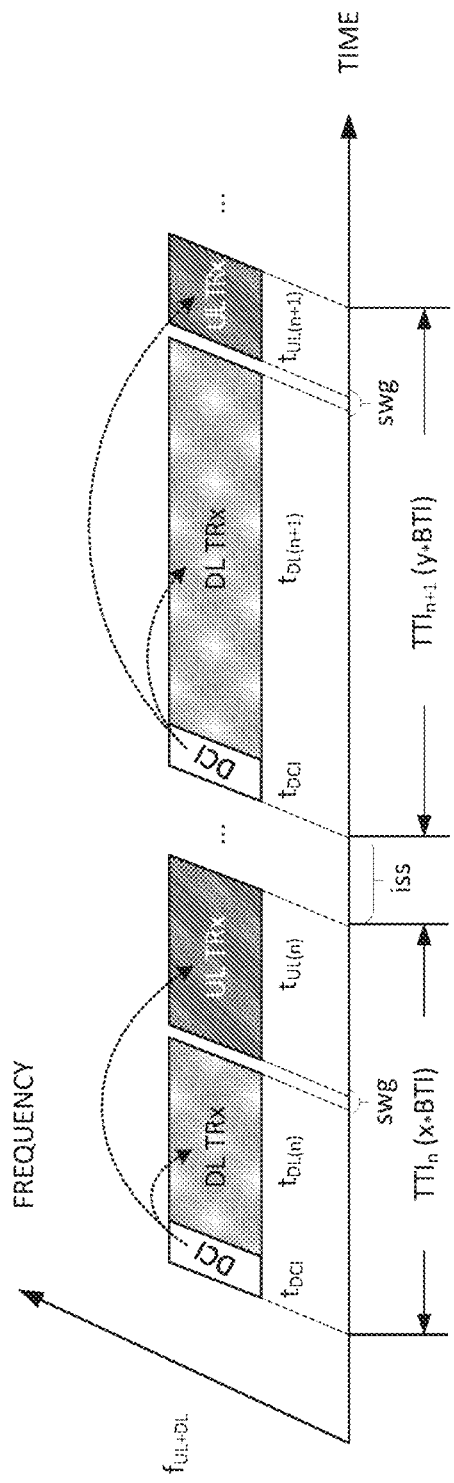
FIG. 4 is an example of timing relationships for time division duplex (TDD) duplexing.
Figure 5:
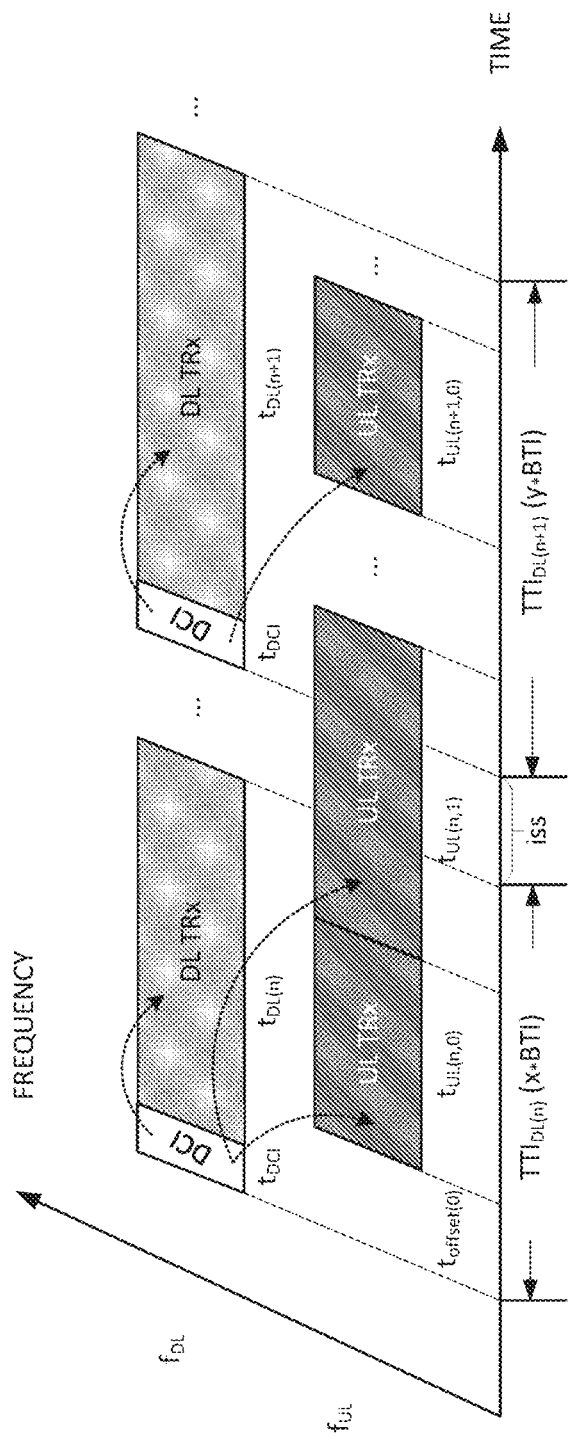
FIG. 5 is an example of timing relationships for frequency division duplex (FDD) duplexing.

Examples of frame structures may be shown in FIG. 4 (TDD) and FIG. 5 (FDD). FIG. 4 is an example of timing relationships for TDD duplexing. FIG. 5 is an example of timing relationships for FDD duplexing.

A scheduling function may be supported in the MAC layer. There may be, for example, two scheduling modes: (1) network-based scheduling, e.g., for tight scheduling in terms of resources, timing and transmission parameters of downlink transmissions and/or uplink transmissions, and (2) WTRU-based scheduling, e.g., for more flexibility in terms of timing and transmission parameters. Scheduling information may be valid for a single or for multiple TTIs, e.g., for one or both modes.

Network-based scheduling may enable a network to tightly manage available radio resources assigned to different WTRUs, e.g., to optimize the sharing of resources. Dynamic scheduling may be supported.

WTRU-based scheduling may enable a WTRU to opportunistically access uplink resources with minimal latency, e.g., on a per-need basis within a set of shared or dedicated uplink resources, which may be assigned (e.g. dynamically or statically) by the network. Support may be provided for synchronized and/or unsynchronized opportunistic transmissions, Support may be provided for contention-based transmissions and/or contention-free transmissions.

Support may be provided for opportunistic transmissions (e.g. scheduled or unscheduled), for example, to meet an ultra-low latency requirement (e.g. for 5G) and/or a power saving requirement (e.g. for an mMTC use case).

Random access (e.g. in LTE) may be used, for example, for one or more of the following: (i) initial access (e.g. when establishing a radio link, such as moving from RRC_IDLE to RRC_Connected); (ii) to re-establish a radio link after radio link failure; (iii) for handover (e.g. when uplink synchronization needs to be established to the new cell); (iv) to establish uplink synchronization (e.g. when uplink or downlink data arrives when the terminal is in RRC_Connected and the uplink may not be synchronized); (v) for positioning (e.g. using positioning procedure(s) based on uplink measurements) and/or (vi) as a scheduling request (e.g. when dedicated scheduling request resources have not been configured on PUCCH).

A random access attempt may be contention-based or contention-free. For example, a WTRU may perform a contention-based random access or a contention-free random access. A contention-based random access may use multiple (e.g., four) steps. For example, a contention-based random access may include the WTRU sending a random access preamble. The random access preamble may allow an eNB to estimate transmission timing of a terminal. A contention-based random access may include a network sending a timing advance command, for example, to adjust the terminal transmission timing. The terminal transmission timing may be adjusted based on the transmission timing estimated by the eNB. A contention-based random access may include a transmission of a WTRU identity to a network, e.g., along with control signaling by the WTRU. A contention-based random access may include the network sending a contention resolution message to the WTRU.

There may be no need for contention resolution, for example, in a contention-free random access. A contention-free random access may include a WTRU sending a random access preamble to a network and/or the network sending a timing advance command in response to the random access preamble. The timing advance command may indicate an adjusted terminal transmission timing.

A 5G air interface may support a wide variety of use cases (where each may have different QoS requirements), for example, in terms of differentiation between applicable radio resources and transmission procedures (e.g. in terms of TTI duration, reliability, diversity applied to the transmission and maximum latency).

Further QoS differentiation may be introduced between different data packets, data flows and/or data bearers (or their equivalent), for example, in terms of maximum guaranteed delay budget, packet error rate and data rate.

A MAC layer may handle functionality that may address the foregoing, for example, to address one or more of the following: (i) satisfying prerequisites for uplink transmissions; (ii) reduction of latency associated with uplink transmissions and/or (iii) Reduction of Signaling Associated with Uplink Transmission.

Satisfaction of prerequisites for uplink transmissions may comprise, for example, UL TA, positioning, WTRU speed and/or PL estimate. For example, a WTRU may manage and/or determine whether it has sufficient prerequisites to perform a given type of transmission, e.g., given use cases and transmission procedures.

Reduction of latency associated with uplink transmissions may be provided. Uplink timing may be ensured through TA commands sent to CONNECTED WTRUs. This may not be practical for ULL devices that (e.g. only) communicate occasionally, for example, given that latency of establishing uplink timing may be too large. Moving to a new cell may involve establishing uplink timing to the new cell, e.g., through RACH. Latency associated with uplink timing establishment for a ULLRC device may be avoided to support ULLRC.

Reduction of signaling associated with uplink transmission may be provided. Uplink transmissions may involve maintaining or gaining uplink synchronization, e.g., through a legacy RACH procedure. An mMTC use case (e.g. in 5G) may consist of having many WTRUs communicating to/with a network through short and occasional data transmissions. WTRUs may have very long batter life (e.g. beyond 10 years) and may be able to operate in an area with a high connection density (e.g. 1,000,000 devices per square kilometer): Signaling efficiency for 5G devices may (e.g. as a result) be improved (e.g. in comparison with LTE).

A WTRU may be configured with an enhanced random access procedure. An enhanced random access procedure may include less signaling between the WTRU and the network. An enhanced random access procedure may include transmission of a first message (e.g., eMSG1) to the network and reception of a second message (e.g., eMSG2) from the network. The first message may be an eRACH transmission.

An enhanced random access procedure may be beneficial for WTRUs that may not be uplink synchronized, for example, to reduce latency for an initial transmission of a data burst and/or for small data transfers. For example, an enhanced random access procedure may enable a WTRU to send data before receiving a grant from the network.

In an example, a first message (e.g., eMSG1) may include a transmission of data combined with a preamble sequence. A transmission may use resources that may be disjointed in time and/or frequency. A transmission may use combined resources in time and/or frequency, e.g., such that a single resource may be used for the preamble and the data portion. For example, a preamble sequence and a data portion may be sent using separate resources, where such resources may be associated with each other. Sending the preamble sequence and the data portion using separate resources may be considered as separate transmissions. As another example, a preamble sequence may be added (e.g., prepended) to a data portion. Adding the preamble sequence to the data portion may be considered to be a single transmission. HARQ may be applicable to the data portion of a transmission. For example, an enhanced random access procedure may support retransmission of the first message, retransmission of the preamble only (e.g., as a fallback to the legacy RACH procedure), and/or retransmission of the data portion only (e.g., using HARQ).

In an example, a second message (e.g., eMSG2) may include a response to the first message. A response to the first message may include, for example, a Timing Advance Command (TAC) and/or HARQ feedback for the data portion, for one or more grant(s) for retransmission of the data portion, and/or for a new transmission.

In an example, an enhanced random access procedure may enable low latency access for an unsynchronized WTRU, for example, when data becomes available in the unsynchronized WTRU (e.g., uplink data arrival and/or control plane signaling) and/or when a WTRU may receive downlink control information that may indicate the WTRU should initiate an enhanced random access (e.g., downlink data arrival).

Figure 6:
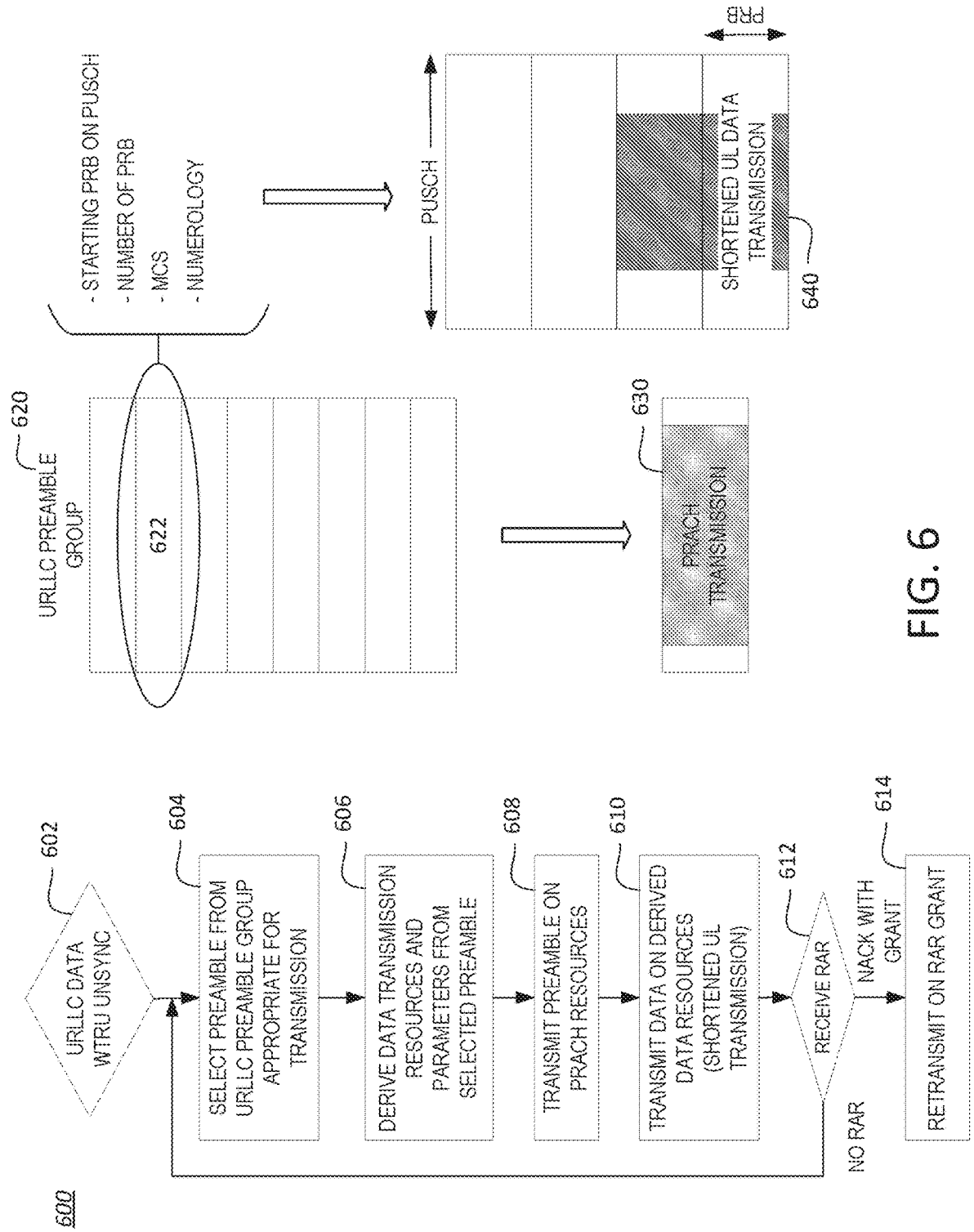
FIG. 6 is an example of an enhanced random access channel (eRACH) procedure.

FIG. 6 is an example of an enhanced random access channel (eRACH) procedure 600. At 602, a WTRU may have data to be transmitted. At 604, the WTRU may select a preamble 622 from a group 620 of preambles. At 606, the WTRU may determine data transmission resources and/or parameters based on the selected preamble 622. At 608, the WTRU may send the preamble 622 on one or more PRACH resources. At 610, the WTRU may send data (e.g., via a shortened UL transmission 640) on the determined data transmission resources. At 612, the WTRU may receive a RAR from the network. If the WTRU does not receive a RAR from the network, the WTRU may repeat 604, 606, 608, and 610. If the WTRU receives a NACK with a grant, the WTRU may retransmit the data, at 614.

A WTRU may initiate an eRACH procedure 600. A network may initiate an eRACH procedure 600 using, for example, eMSG0 (e.g., NR-PDCCH order or L3/RRC). Message eMSG0 may include control information.

A WTRU may initiate an eRACH procedure, for example, in response to one or more of the following events: (i) a WTRU-dedicated network (NW) order, (ii) a dynamic scheduling of CB-eRACH resources, e.g., combined with WTRU-autonomous triggers and/or (iii) L3/RRC (or MAC CE) network-controlled mobility.

A WTRU may initiate an eRACH procedure, for example, in response to a WTRU-dedicated NW order, such as upon reception of downlink control signaling (e.g., a DCI on NR-PDCCH) that may include an indication and/or a request for a WTRU to perform such eRACH procedure. The downlink control signaling may include one or more WTRU-dedicated eRACH parameters to be used in the eRACH procedure.

A WTRU may initiate an eRACH procedure, for example, in response to a dynamic scheduling of CB-eRACH resources. For example, the WTRU may initiate an eRACH procedure in response to scheduling of CB-eRACH resources if the WTRU also detects one or more WTRU-autonomous triggers. An example of a WTRU-autonomous trigger may include reception of downlink control signaling (e.g. a DCI on NR-PDCCH). The downlink control signaling may include scheduling information for transmission of a first message of the eRACH procedure (e.g., eMSG1) and a trigger such as a WTRU-autonomous trigger. The downlink control signaling may include one or more eRACH parameters for a contention-based access. DCI may be scrambled with an RNTI that may be shared by a plurality of WTRUs, e.g., including a "cell/system"-specific RNTI for eRACH.

A WTRU may initiate an eRACH procedure, for example, in response to L3/RRC (or MAC CE) network-controlled mobility, such as upon reception of L3/RRC control signaling (or MAC CE) that may include a reconfiguration with a mobility event. The L3/RRC may include one or more dedicated eRACH parameters.

Control information (e.g., in eMSG0) may include, for example, one or more of the following: (i) a resource indicator, (ii) a preamble index, (iii) power control information TPC, and/or (iv) a grant.

A resource indicator (e.g., in a DCI and/or RRC message) may, for example, correspond to a resource block assignment. A resource indicator may be associated with the data portion (e.g., and not a control portion and/or preamble portion). A resource indicator may be associated with the preamble transmission only (e.g., contention-free random access—CFRA). A WTRU may determine a resource allocation for the data portion as a function of the resource assignment of the preamble. A WTRU may (e.g., alternatively) determine a resource allocation for the preamble and the data portion, for example, when a joint resource is used or when the WTRU may determine separate resources (e.g., from an index in a table or similar).

DCI may be received on NR-PDCCH or another similar channel. One or more resources may be dedicated (e.g., contention-free) to a specific WTRU. For example, one or more resources may be dedicated to a specific WTRU when the DCI is received using C-RNTI or equivalent. One or more resource(s) may (e.g., alternatively) be shared (e.g., contention-based) and may be accessible to a plurality of WTRUs (e.g., when scrambled using a shared RNTI such as CB-eRACH-RNTI.

A Preamble index (e.g., in a DCI and/or an RRC message) may, for example, indicate a specific preamble sequence (e.g., for dedicated signaling). A preamble index may indicate a specific preamble group and/or range (e.g., for shared signaling).

Power Control information (e.g., such as transmit power control (TPC)) may be included in a DCI and/or an RRC message. The power control information may be applicable to preamble transmission on ePRACH, for the data portion, one for each or one for both.

A grant (e.g. in a DCI and/or RRC message) may be received (e.g. in control signaling) by a WTRU. The grant may be associated with the transmission of eMSG1. The grant may be for the transmission of eMSG1. The grant may (e.g. alternatively) be for the transmission of a data portion of eMSG1. Preamble transmission may be performed according to other information received in the control signaling, such as according to other parameters, e.g., as described herein. For example, a WTRU-dedicated grant may be indicated (e.g. for dedicated signaling) or a contention-based grant (e.g. for shared signaling).

In an example of network (NW)-controlled contention a WTRU may have one or more autonomous triggers. For example, a WTRU may determine that it has data available for transmission. The data transmission may be applicable to an eRACH procedure. The WTRU may decode a downlink control channel, for example, using a shared RNTI (e.g. CB-eRACH-RNTI). The WTRU may decode a DCI that may include dynamically scheduled system-specific ePRACH parameters (e.g. and an associated grant and/or set of PRBs for the data portion). The WTRU may initiate a transmission of a preamble, e.g., using the determined ePRACH resources, and a transmission of the data portion, e.g., using the received grant and/or subset of PRB(s).

The WTRU may determine from control signaling whether it should perform the eRACH procedure according to contention-free or contention-based principles.

A WTRU may initiate an eRACH procedure, for example, to perform initial access, to request transmission resources (e.g. a scheduling request such as eRA-SR), to transmit an amount of data (e.g. based on a threshold), to perform WTRU-autonomous mobility, a scheduling request or based on network order. A WTRU may (e.g. as part of the procedure) select the procedure (e.g. legacy RACH versus eRACH), for example, based on service, DRB, type of accesses currently available to the WTRU, etc. The WTRU may determine whether to select a legacy RACH procedure or an eRACH procedure based on a type of uplink data to be transmitted and/or the purpose of the random access request. For example, the WTRU may select the legacy RACH procedure for type 2 data. Type 2 data may include enhanced mobile broadband (eMBB) data, for example. As another example, the WTRU may select the eRACH procedure for type 1 data. Type 1 data may include ultra-reliable and low latency communications (URLLC) data, for example.

A WTRU may select an eRACH procedure. A WTRU may select a preamble sequence, e.g., in addition to resources for preamble and data. The resources used for a preamble and the resources used for data may have some association, such as an implicit association. A WTRU may determine which data (if any) may be transmitted in the data resources and may determine applicable PHY/MAC control information to be transmitted, for example based on the preamble that was used.

A WTRU may trigger the PHY layer to transmit the preamble on selected resources for preamble transmission and may send control information and any data to the PHY layer for transmission on the selected data resources.

A WTRU may (e.g. following preamble and data transmission) perform monitoring of the control channel for detection of eRAR. A WTRU may perform DRX (e.g. DRX for control channel monitoring) for a period of time prior to a specific eRAR expected reception time or time window.

An eRACH procedure may be triggered. A WTRU may initiate an eRACH procedure, for example, as a consequence of one or more of the following events: (i) The WTRU determines that is has data available for transmission; (ii) the WTRU determines that it should perform WTRU-autonomous mobility and/or (iii) the WTRU determines that it should perform a reconfiguration of a L1/PHY aspect and/or a Uu interface.

A WTRU may determine that is has data available for transmission. For example, this may correspond to one or more of the following events: (i) initial access of a WTRU to a cell or TRP (e.g. the WTRU may make a first transmission to a cell or TRP while in an IDLE state or state of non-communication); (ii) initiation of a new service or logical channel and/or (iii) arrival of data at the WTRU.

A WTRU may determine that it should perform WTRU-autonomous mobility. For example, this may correspond to a transition/handover from one cell/TRP to another cell/TRP.

A WTRU may determine that it should perform a reconfiguration of a L1/PHY aspect and/or a Uu. For example, this may correspond to one or more of the following events: (i) creation/use/addition of a new beam and/or (ii) addition of a cell/TRP to the WTRU's set of active cells/TRPs.

A WTRU may make a determination, for example, (e.g. only) when it does not have valid uplink timing alignment.

A WTRU may determine that it should initiate a RACH procedure while it already has an ongoing eRACH procedure. In an example, the WTRU may perform one or more of the following:

A WTRU may continue with the ongoing eRACH procedure (e.g. unless the trigger to initiate the RACH procedure may be due to a mobility event that may invalidate the current resources used for the ongoing eRACH procedure) to a recovery procedure that may be related to the execution of the ongoing eRACH procedure (e.g. due to a failure case such as maximum number of eMSG1 transmissions, failure to detect/measure applicable reference signal, loss of downlink synchronization or the like) or to any other impairment to the ongoing eRACH procedure. A WTRU may refrain from initiating the RACH procedure (e.g. eRACH may be prioritized when ongoing and when fulfilling a similar purpose).

A WTRU may (e.g. otherwise) initiate a RACH procedure. A WTRU may continue with an ongoing eRACH procedure (e.g. both procedures may run in parallel such as when fulfilling different purposes). Both procedures may run in parallel, for example, when new data becomes available for transmission that may be associated with or applicable to a SRB, a DRB, a numerology (e.g. a type of SOM), a numerology block (e.g. a SOM), a TrCH or similar and that may otherwise not have triggered a procedure similar and/or corresponding to the ongoing eRACH and/or its resources.

A WTRU may determine that it should initiate an eRACH procedure while it may already have an ongoing RACH procedure. A WTRU may perform one or more of the following:

A WTRU may continue with the ongoing RACH procedure, for example, when the determination to initiate an eRACH procedure may not be (e.g. directly) related to criteria (or type thereof) that triggered the ongoing RACH procedure. For example, this may include new data that may become available for transmission, may be associated with or applicable to an SRB, a DRB, a numerology (e.g. a type of SOM), a numerology block (e.g. a SOM), a TrCH or similar and may otherwise not have triggered a procedure similar and/or corresponding to the ongoing RACH and/or its resources.

A WTRU may (e.g. otherwise) prioritize and initiate the eRACH procedure. The WTRU may cancel the ongoing RACH procedure, for example upon initiating the eRACH procedure.

A WTRU may determine that it should initiate a second eRACH procedure while it has a first ongoing eRACH procedure. In this case, the WTRU may perform one or more of the following:

A WTRU may continue with the first ongoing eRACH procedure, for example, when the determination to initiate a second eRACH procedure may be related or similar to a criteria (or type thereof) that triggered the first instance of the eRACH procedure (e.g. an event that may trigger an eRACH procedure corresponding to the same set of eRACH resources utilized by the first instance of the eRACH procedure). An event may include new data that may become available for transmission, may be associated with and/or applicable to an SRB, a DRB, a numerology (e.g. a type of SOM), a numerology block (e.g. a SOM), a TrCH or similar that may be associated with such eRACH resources. Different beam processes associated with the same specific reference signal (e.g. corresponding to the same TRP) may be considered the same resource unless the trigger may be related to beam management.

A WTRU may (e.g. otherwise) initiate a second instance of the eRACH procedure.

A set of eRACH resource(s) may include one or more of a set of preambles, preamble resources, data resources/association, transmission frequency, etc.

A WTRU may determine an applicable RACH procedure, e.g., legacy RACH or eRACH procedure. A WTRU may initiate a random access. The WTRU may determine that it should perform a random access procedure. The WTRU may (e.g. further) determine that a plurality of such access procedures may be used (e.g. a legacy RACH or a eRACH procedure). The WTRU may determine whether to select, for the random access, a first RACH procedure or a second RACH procedure. The first RACH procedure may be a legacy RACH procedure and/or a 4-step RACH procedure. For example, a legacy RACH procedure may include four steps. The second RACH procedure may be an eRACH procedure and/or a 2-step RACH procedure. For example, an eRACH procedure may include two steps.

When the WTRU selects the second RACH procedure, the WTRU may determine at least one PRACH resource associated with the second RACH procedure. The WTRU may determine a preamble sequence associated with the second RACH procedure. The WTRU may determine a data resource for uplink data, for example, based on the at least one PRACH resource, the preamble sequence, a type of uplink data, and/or a size of uplink data. The WTRU may send a RACH transmission to a network device using the at least one PRACH resource and the data resource. The RACH transmission may include the preamble sequence and the uplink data.

A WTRU may determine to perform an eRACH procedure according to one or more factors. Several examples are provided below.

A WTRU may determine to perform an eRACH procedure, for example, based on its connectivity state (e.g. IDLE, CONNECTED, "light connected"). A determination may be made in combination with other conditions. Conditions for selection may be different, for example, depending on a WTRU's connectivity state.

A WTRU may determine to perform an eRACH procedure, for example, based on a specific trigger received for initiation of the procedure.

A WTRU may determine to perform an eRACH procedure, for example, based on its (e.g. current) timing alignment status or specific timing alignment criteria or whether it may be allowed to transmit preamble combined with data. A WTRU may be allowed to transmit preamble combined with data, for example, when the time since its last UL transmission, or the time since last reception of a timing advance command may not exceed a predefined or network-provided threshold. A WTRU may (e.g. alternatively or additionally) make a determination based on a cell-size provided by the network. In an example, a WTRU may be allowed to perform transmission of preamble combined with data or use a different set of thresholds for comparison of its timing alignment status when making such determination, for example, when cell size may be less than a pre-defined or configured threshold.

A WTRU may determine to perform an eRACH procedure, for example, based on a network configuration, which may be provided in system information. A determination may be made whether a 2-step or 4-step procedure should be used. Network configuration information may be provided in broadcast system information (e.g. SIB) and may indicate which RACH procedure to be used. Such information may also indicate or be used to determine additional behavior of a WTRU during the RACH procedure. In an example, a 2-step approach may be applied and the WTRU may not expect a TAC in eMSG2, for example, in small cells where TA may not be required.

A WTRU may determine to perform an eRACH procedure, for example, based on amount/duration of data transmission. A WTRU may determine that it can transmit preamble combined with data, for example, when a desired data transmission may not exceed a pre-defined or configured amount or when the transport block duration does not exceed a pre-defined or configured duration. A data amount may be based on an amount of data that may be available for transmission and/or an amount of data buffered by a WTRU for one or more specific logical channels/services or on the duration of a transport block that may be required to transmit a pending transmission or message.

A WTRU may determine to perform an eRACH procedure, for example, based on the type of data/transmission. For example, a WTRU may determine that it should perform an eRACH procedure based on a property associated with the data to transmit or the type of transmission to be made. A WTRU may make a determination for (e.g. only) a specific logical channel or a specific type of message (e.g. RRC control message). A WTRU may make a determination based on transmission time-requirements associated with the data, such as an expired time for successful transmission for data.

A WTRU may (e.g. further) be configured with a set of logical channels or equivalent that a WTRU may select to transmit data, e.g., using the eRACH procedure. A WTRU may distinguish or determine whether the type of data to be transmitted meets the criteria for an eRACH based on one or more of the following: (i) applicable service type and/or corresponding QoS associated with the data/access; (ii) bearer configuration and/or (iii) the type of and/or identity of a radio bearer (e.g. SRB or DRB) for which the data may (e.g. is to) be transmitted.

In an example, e.g., upon bearer establishment, a bearer may indicate whether it allows for transmission in an inactive state and/or data transmission using an eRACH procedure.

In an example, a WTRU may be configured by a network to perform data transmissions, for example, using an eRACH procedure (e.g. only) for certain radio bearers. A WTRU may (e.g. also) receive a configuration, for example, based on a previous request. In an example, a WTRU may move from a connected state to an inactive state. The WTRU may request which bearers may be allowed for data transmission, e.g., using an eRACH procedure.

In an example, a WTRU may be placed in an inactive state and may be provided with a new bearer (e.g. by a network) for transmission while in the inactive state. A WTRU may (e.g. also) be provided with the rules to map specific application-layer data arriving at the WTRU to the bearer while it may be in the inactive state. A WTRU may perform an eRACH procedure upon arrival of data to that specific bearer. A WTRU may perform a legacy RACH procedure, for example, when data arrives for another bearer.

A WTRU may determine to perform an eRACH procedure, for example, based on an observed data rate. A WTRU may make a determination based on the observed data rate (e.g. frequency of packet arrival) at the WTRU. A WTRU may compare an observed data rate to a configured threshold rate for performing eRACH (e.g., 2-step rather than 4-step procedures). Determinations may be made for a specific logical channel or radio bearer.

A WTRU may determine to perform an eRACH procedure, for example, as a result of a timer expiring. For example, a WTRU may be configured to transmit a preamble combined with a data transmission at least every (x) seconds. A WTRU may (e.g. upon timer expiration) perform a transmission regardless of the presence of data for transmission at the expiration of the timer (e.g. by transmitting a BSR or other control information when no other data is present or leaving the data resources empty). This may allow a WTRU to maintain a certain level of timing alignment (e.g. rough timing alignment) so that it may continue to use eRACH (e.g., a two-step approach) and/or limit the length of a guard period when using eRACH (e.g., a two-step approach).

A WTRU may determine to perform an eRACH procedure, for example, based on a synchronization signal (e.g. the presence or property of a synchronization signal from which PRACH resource or PRACH sequence may be derived). A WTRU may use information about a synchronization sequence to make a determination, such as one or more of: (i) frequency band and associated type of access, (ii) sequence property, and/or (iii) presence of a second signature sequence.

In an example of using a frequency band and associated type of access, a WTRU may determine that the presence of a synchronization signal on a specific frequency may be associated with use of an eRACH procedure (e.g. licensed versus unlicensed).

In an example of using a sequence property, a WTRU may determine that an index associated with the synchronization signal may indicate to perform an eRACH procedure. An index may, for example, be associated with a beam index.

In an example of using a presence of a second signature sequence, a WTRU may determine that the presence of a second signature sequence, which may be related to the first sequence and may have a specific sequence property, may indicate performance of the eRACH procedure.

A WTRU may determine to perform an eRACH procedure, for example, based on whether the WTRU is configured with C-RNTI. For example, the WTRU may initiate an eRACH procedure when it is configured with a C-RNTI.

A WTRU may use a (e.g., alternative) selection procedure for determination of the procedure, for example, when the WTRU may detect a synchronization signal for RACH procedure and a synchronization signal for an eRACH procedure. A WTRU may determine an applicable RACH procedure, e.g., legacy or eRACH procedure, for example, based on one or more factors. Several examples are provided below.

A WTRU may determine an applicable RACH procedure, e.g., legacy RACH or eRACH procedure, for example, based on a measured channel occupancy. A WTRU may make measurements of channel occupancy and may choose to transmit a preamble combined with data, for example, when the measured channel occupancy may be larger than (or less than) a defined or configured threshold. A determination may support unlicensed deployments, where access to the channel may be maintained in situations of high load, for example, by transmitting a preamble combined with data (e.g. as opposed to an LTE-like RA procedure with four independent channel access procedures).

A WTRU may determine an applicable RACH procedure, e.g., legacy RACH or eRACH procedure, for example, based on estimated path loss and channel conditions. A WTRU may make measurements of path loss or channel based on reference signals and may determine whether to use 2-step vs 4-step, for example, depending on whether an estimated path loss may be below or above a certain threshold. In an example, a WTRU may select a 2-step procedure, for example, when the path loss may be below a threshold. A threshold may be broadcast by a network. A threshold may depend on the frequency band. This may allow a WTRU to estimate a distance to a cell/TRP and determine whether to use 2-step procedure, e.g., when the WTRU may be within a certain distance to the cell/TRP.

A WTRU may determine an applicable RACH procedure, e.g., legacy RACH or eRACH procedure, for example, based on a sync sequence index. A sync sequence index may convey information about a sync sequence transmit power and/or TRP power class, for example, so the WTRU can estimate path loss without receiving further system information. This may be useful, for example, when "PRACH" may be transmitted after synchronization.

A WTRU may determine an applicable RACH procedure, e.g., legacy RACH or eRACH procedure, for example, based on a Target TRP. A WTRU may determine to use a eRACH procedure, for example, when a target TRP may belong to the same TRP group most recently used by the WTRU (e.g. within a configurable time period). For example, a WTRU may have sparse and bursty communication to a TRP interspersed with long periods of inactivity. This may enable a WTRU to reuse pre-configured parameters to enable efficient eRACH. In an example, a WTRU may perform a legacy RACH, for example, upon expiration of a timer, e.g., regardless whether an intended target of a random access procedure is the same or is from the same TRP group.

A WTRU may determine an applicable RACH procedure, e.g., legacy RACH or eRACH procedure, for example, based on a response from a network. A WTRU may determine, (e.g. based on a network response in a previously performed eRACH procedure or a related message) that further accesses or data transmissions may be made using a legacy RACH procedure. In an example, a WTRU may perform an eRACH procedure where the network may respond with an indication (e.g. implicit or explicit) to retry, for example, using a legacy RACH procedure. An indication may be associated with a backoff indication.

A WTRU may decide to perform an eRACH procedure, for example, to allow data transmission while remaining in an inactive state. Conditions for selecting an eRACH procedure may (e.g. also) be applicable to a WTRU deciding to perform data transmissions while remaining in a new state. A WTRU may be configured with conditions for which it may remain in the inactive state while performing data transmission (e.g. as described above). A WTRU may select an eRACH procedure as a result of the conditions.

A WTRU may (e.g. alternatively) perform an eRACH procedure for data transmission in the inactive state or to transition to RRC CONNECTED. A WTRU may indicate (e.g. implicitly or explicitly as part of the preamble or data transmission) in the eRACH procedure whether to transition to RRC CONNECTED or remain in the inactive state.

A WTRU may receive a message that indicates a network order to perform an eRACH procedure. For example, Enhanced message 0 (eMSG0) may provide the network order. A WTRU may determine to transmit eMSG1 and/or initiate an eRACH procedure, for example, upon reception of DL signaling from a network. In an example, DL signaling may be received from the network via downlink control information (DCI) on a control channel.

An eRACH procedure may be triggered. A WTRU may determine that a DCI may indicate that the WTRU should initiate a random access procedure. For example, the WTRU may determine that the DCI indicates a random access procedure based on one or more of: time of reception, frequency of reception, type of control channel, explicit indication, RNTI, WTRU operating mode, inclusion of UL preamble resources and/or inclusion of UL data resources.

In an example of time of reception, a DCI may be received in a time instant (e.g., subframe, slot, mini-slot, etc.) associated with a specific procedure where the concerned reception time instant corresponds to an eRACH procedure. For example, a specific slot in each frame may be reserved for reception of a DCI that may indicate that the WTRU should initiate a random access procedure.

In an example of frequency of reception, a DCI may be received on a frequency resource (e.g. specific CCE, resource block, frequency band, carrier, etc.) that may be associated with a specific procedure, where the concerned frequency resource may correspond to (e.g., or indicate) the RACH or eRACH procedure.

In an example of type of control channel, a DCI may be received on a control channel, a set of CCEs, a numerology block, a search space, and/or using a specific numerology associated with a specific procedure, where the concerned aspects may correspond to initiation of an eRACH procedure.

In an example of explicit indication, a DCI may include an indication of the type of procedure (e.g. RACH or eRACH). The WTRU may receive an eRACH indication. An eRACH indication may be, for example, one or more explicit flags or fields in a DCI, in the DCI format or a combination thereof.

In an example of RNTI, a DCI may be encoded with an RNTI associated with a specific procedure (e.g. RACH or eRACH). The RNTI may correspond to initiation of an eRACH procedure.

In an example of a WTRU operating mode, a WTRU may be in an operating mode associated with performing a certain procedure upon reception of a trigger. The operating mode and/or the trigger may correspond to initiation of an eRACH procedure. Triggers may correspond to any combination of other determination procedures (e.g. explicit indication). A WTRU may have been placed in a mode based on reception of DL signaling. For example, a WTRU may receive an RRC message which may place the WTRU in a mode of operation associated with reception of eMSG0. A WTRU may (e.g. in this mode) may interpret the reception of a DCI (e.g. which may have one or more additional conditions for association with eRACH initiation) as an eMSG0.

In an example of inclusion of UL preamble resources, a DCI may include one or more UL preamble resources (e.g. preamble range, preamble set, preamble value, PRB indicator for preamble transmission, etc.). A WTRU may determine that the UL preamble resources may be associated with a specific procedure (e.g. RACH or eRACH). The UL preamble resources may correspond to resources for an eRACH procedure.

In an example of inclusion of UL data resources, a DCI may include uplink data resources (e.g. a PRB indicator for the data portion, numerology block for a data portion, or the like). A WTRU may determine that the resources may be (e.g. are) associated with an eRACH procedure.

A WTRU may initiate (e.g., start) an eRACH procedure, for example, upon transmission of eMSG1. eMSG1 may include a preamble and data. The starting time for an eRACH procedure may be determined by a WTRU, for example, based on signaling within a DCI and/or additional signaling/rules.

In an example, a WTRU may determine a time of transmission for a preamble following reception of eMSG0, for example, based on information received in a DCI message and/or based on a fixed timing relationship. For example, a fixed timing relationship may be represented as n+x, where n may be a time of reception of the DCI and x may be an offset in time. An offset may be a fixed offset or may be provided to the WTRU, e.g., through system information or dedicated signaling (e.g. RRC, MAC, or same/another DCI). In an (e.g. alternative or additional) example, which may be used in combination with another determination, a WTRU may determine a time of transmission for a preamble, for example, based on a specific time associated with a preamble resource to be used. For example, a WTRU may determine that an eRACH procedure may be started at the next occurrence of a PRACH resource (e.g. when such resources may be predefined or indicated by signaling prior to or during reception of a DCI), for example, following reception of a DCI or following a time offset after reception of the DCI.

A DCI (e.g. its contents) may contain the information, which may be used by a WTRU during the performance of a eRACH procedure. Information may comprise, for example, one or more of the following: (i) transmission properties of a preamble, such as numerology, preamble sequence, code, transmit power, etc.; (ii) transmission properties of data, such as MCS, scrambling code/pattern, transmit power, etc.; (iii) resources to use for preamble sequence; (iv) resources for a data part; (v) association rules between preamble resources and data resources, such as an index to a table of predefined association rules, a time and/or frequency offset between them or other parameters that may define an association rule and/or (vi) properties associated with retransmission, such as retransmission delay, power ramping, maximum number of HARQ retransmissions, HARQ process number, etc.

An enhanced message 1 (eMSG1) may be provided. In an example, a WTRU may transmit data combined with a preamble sequence that may be disjointed in time/frequency or combined with a preamble (e.g. prepending a preamble sequence to a data transmission).

In an example, a preamble and a data portion of one or more transmissions may be tied using an association.

A relationship between preamble and data may be in a time domain. For example, a start time of a transmission of a preamble and a start time of a transmission of a data portion may be offset from each other by a specific amount of time. A start time may correspond to a first symbol of a slot, mini-slot, a subframe or to a specific symbol thereof (e.g. first symbol of a corresponding PRB region that may, for example, not be dedicated to control signaling). A relationship (e.g. offset) may be equal to zero, for example, when transmission of a preamble and a data portion may be continuous in time. This may, for example, facilitate blind decoding of data in a receiving node from a priori knowledge of timing of a transmission of a data portion, e.g., as may be indicated by a preamble.

A relationship between preamble and data may be in a frequency domain. For example, a first PRB of a transmission of a preamble and a first PRB of a transmission of a data portion may be offset from each other by a specific amount of PRBs. An offset may be equal to zero, for example, when there may be joint transmission of the preamble and of the data portion. An association may be valid for a given transmission time duration (or for a specific overlap in time of the respective transmission duration), for example, for a given slot, mini-slot, subframe or to a specific symbol thereof (e.g. one or more symbols of resources that may, for example, not be used for dedicated to control signaling). An association may (e.g. alternatively) be applicable over non-overlapping (e.g. disjointed in time) time intervals, for example, in combination with another procedure. This may, for example, facilitate blind decoding of data in a receiving node from a priori knowledge of a first PRB of a transmission of a data portion, e.g., as may be indicated by a preamble.

A WTRU may determine an offset in time/frequency, for example, using one or more (e.g. a combination) of the following procedures: (i) fixed or predefined (e.g. configured in the WTRU and assumed for at WTRUs); (ii) provided in system information (e.g. through broadcast on SIBs or provided in an access table); (iii) based on explicit indication (e.g. explicitly indicated in DCI, or in a downlink control message such as MAC CE or RRC); (iv) based on a selected preamble (e.g. a preamble may be associated with a specific offset to be used, where an association may be fixed or configured by a network); (v) based on a selected PRACH resource (e.g. a PRACH resource may be associated with a specific offset to be used, where an association may be fixed or configured by a network) and/or (vi) random selection (e.g. a WTRU may select from a number of possible offsets that may be determined to be usable by the WTRU).

For example, a WTRU may select a resource for data to occur in a first available UL resource for transmission of data following transmission of the preamble. Resources may be provided to a WTRU through network signaling. PRBs selected by a WTRU to transmit data may be (e.g. further) randomly selected by a WTRU. A WTRU may be limited to choosing a fixed number of PRBs for a data transmission.

A relationship between preamble and data may be in a length/size/duration of transmission. For example, the number of resource blocks or the transport block size of a transmission of a WTRU may be associated with properties of the preamble, such as the preamble sequence, preamble length or preamble resources. An association may be predefined or provided by network configuration.

A relationship between preamble and data may be in encoding/scrambling of data. Encoding, scrambling or CRC for data may be associated with properties of the preamble. For example, a WTRU may apply a CRC using all or part of the preamble sequence. A WTRU may (e.g. also) modify a CRC, for example, based on resources selected for a preamble. In an example, a WTRU may determine to use a part of a preamble as a CRC, for example, when it transmits the preamble, e.g., using a first range of resources, when it determines to use another part of the preamble as the CRC or when it transmits the preamble using a second range of resources.

A relationship between preamble and data may be in numerology. For example, a WTRU may use a numerology for transmission of data that may be related to properties of the preamble, such as the preamble sequence, the resources selected for the preamble, the numerology of the preamble, etc. A WTRU rosy transmit data, for example, using the same numerology as the preamble. A numerology of the preamble sequence may (e.g. alternatively) be the same (e.g. a reference numerology). A WTRU may select the numerology of a data portion, for example, based on a time/frequency location of preamble resources (e.g. specific time-frequency locations associated with a certain numerology) or a preamble sequence (e.g. specific preamble sequences associated with a certain numerology).

A relationship between preamble and data may be in a multiple access scheme or configuration. In an example, a WTRU may select a multiple access scheme (e.g. FDMA, TDMA, CDMA), and configuration parameters (e.g. specific resource elements, scrambling code, randomization parameters) for data transmission, for example, based on properties of the preamble (e.g. sequence, selected resources). For example, a WTRU may select specific resource elements or symbols within resource blocks for transmission of data (e.g. contention-based resources) based on a preamble sequence.

A relationship between preamble and data may be in transmit power. For example, a maximum transmit power for data transmission may be related to a preamble maximum transmit power, preamble sequence, preamble resources or other properties of the preamble. A data transmit power may be a scalar function of preamble transmit power. A function may be preconfigured or configured in a WTRU by a network. A transmit power of a preamble may be determined, for example, by preconfiguration or network configuration and may be changed (e.g. by a specific amount) following retransmissions of the preamble.

A network configuration may be provided.

A per-bearer configuration of an eRACH procedure may be provided. A WTRU may be configured (e.g. in RRC) on a per-bearer basis, for example, to indicate whether it is allowed to use an eRACH procedure to transmit data. An eRACH procedure may be used for transmission while remaining in an inactive state. A configuration may determine whether a specific bearer may (e.g. would) allow a WTRU to perform data transmission while in an inactive state or whether a WTRU in the inactive state may (e.g. would) transition to RRC CONNECTED to transmit data associated with the bearer.

A bearer configuration may (e.g. also) contain additional configuration for an eRACH procedure. A WTRU may determine one or more of the following from a bearer configuration: (i) whether eRACH may be (e.g. is) allowed for transmission of data or whether legacy RACH, and/or transition to RRC CONNECTED may be allowed (e.g. required); (ii) the number of allowable retransmissions (e.g. retries) using an eRACH procedure before fallback to legacy RACH or before transition to RRC CONNECTED; (iii) indication of a preamble or preamble group to use for preamble transmission; (iv) parameters controlling linkage between preamble and data in an eRACH procedure; (v) resource or subset of resources to be used for preamble and/or data transmission; (vi) maximum data transmission size that may be used while performing eRACH or while remaining in an inactive state; (vii) maximum data rate that may be used while performing eRACH, or while remaining in an inactive state; (viii) minimum time between data transmissions using an eRACH procedure allowable for a radio bearer; (ix) configuration of WTRU behavior (e.g. in case of backoff indication from eRAR) and/or (x) whether multiplexing, segmentation and/or concatenation may be allowed for the bearer, which may include associated parameters restricting such operation.

In an example of transmission size, a WTRU may decide to use an eRACH procedure, for example, when the amount of data buffered for the bearer may be below a maximum configured data size. A WTRU may (e.g. otherwise) decide to use a legacy RACH procedure or an eRACH procedure and may indicate an intention to move to RRC CONNECTED.

In an example of data rate, a WTRU may decide to use an eRACH procedure, for example, when the rate at which data arrives for a bearer may be below a maximum configured rate. A WTRU may (e.g. otherwise) decide to use the legacy RACH procedure or an eRACH procedure and indicate an intention to move to RRC CONNECTED.

In an example of configuration for a backoff indication, a WTRU may (e.g. based on such configuration) may be allowed to retry a 2-step procedure, for example, immediately, after a configurable backoff period or may perform data transmission by starting with a 4-step procedure, which may be determined by the configuration of the bearer for which the data was available.

A new/dedicated bearer may be provided for data transmission in an inactive state.

A WTRU may perform data transmission using an eRACH procedure (e.g. only) for a single dedicated bearer. For example, a dedicated bearer may have been established during a transition from RRC CONNECTED state to inactive state.

A WTRU may be configured with a policy for mapping data packets from an application layer to a dedicated bearer (e.g. as opposed to an initially associated bearer created for RRC CONNECTED operation) while the WTRU may be in an inactive state. A policy may comprise, for example, mapping one or a set of TFTs to the new bearer or mapping one or a set of QoS flow identifiers from the network to the new bearer.

A WTRU may determine one or more configuration parameters associated with a configuration of an eRACH procedure (e.g. as described above) from the bearer configuration.

A WTRU may determine (e.g., select) a preamble (e.g., a preamble sequence). A WTRU may select a preamble, for example, based on a (e.g. required) PRACH and/or data reception reliability. For example, one or more preambles (e.g. potentially with data) may be spread over time, frequency, spatial resources, and/or code resources. In an example, a preamble and (e.g. optionally) data may be repeated over multiple resources. A WTRU may determine a required amount of diversity to achieve a (e.g. required) reliability and may (e.g. thus) select a preamble that may achieve such diversity. A diversity (e.g. number of repetitions) of preamble and data portions may not be the same. For example, diversity for PRACH reception may be greater than diversity for data reception. This may avoid a new, full RACH procedure, for example, when data transmission fails.

A WTRU may be limited to using specific properties or a range of properties, e.g., as a result of selection of one or more preambles from a set of configured preambles.

A WTRU may (e.g. alternatively) append a transmission type indicator to a preamble to indicate a transmission type and/or one or more transmission properties.

A WTRU may indicate other information based on its preamble selection. Specific transmission properties or other information, which may be reflected in the choice of preamble, may include, for example, one or more of the following.

A preamble selection may indicate, for example, an amount of data to be transmitted, a maximum TB size, and/or a range of allowable TB sizes. A WTRU may select a preamble based on the amount of data that will be transmitted in the data part. For example, a WTRU may determine the amount of data to be transmitted, e.g., based on the size of pending PDU, control message, IP packet, etc. or whether there may be no data to be transmitted (e.g. preamble transmission triggered by the timer to maintain rough timing alignment). A determination may be limited to a (e.g. only one) specific logical channel, type of data, QoS level, type of service, etc. A WTRU may (e.g. based on the determination) select from one or more preambles that may be associated with the amount of data or select from one or more preambles for which a resulting TB may not exceed a maximum associated with the preamble or falls in the range associated with the preamble.

Preamble selection may indicate, for example, a type of transmission or trigger that may have caused a transmission. A WTRU may select a preamble, for example, based on the type of data or QoS requirements that may be associated with the data. In an example, a WTRU may select one or more from a set of preambles, for example, when the data may be associated with a specific service (e.g. URLLC) or when the data may be associated with one or more or a type of logical channel or QoS marking from upper layers. A WTRU may select a preamble, for example, based on whether an enhanced (e.g., two-step) or a legacy (e.g., 4-step) RA may be performed or based on whether the WTRU was triggered to perform a two-step transmission without data (e.g. to obtain timing alignment only).

A preamble selection may indicate, for example, timing requirements that may be associated with data transmission. A WTRU may select its preamble as a function of transmission latency requirements that may be associated with data. A WTRU may select its preamble as a function of the WTRU's processing capabilities. The WTRU's processing capabilities may include processing time required between reception of downlink control signaling that grant resources for an uplink transmission (e.g. in a message that includes a RAR) and/or the corresponding uplink transmission (e.g. msg3 for a 4-step RACH procedure). A WTRU may select a preamble as a function of a combination of the latency requirement for the data that triggered the RACH procedure and the WTRU's capabilities in terms of such processing time. A WTRU may (e.g. in this case) further track a time that may be required for transmission of the data and may select a preamble based on a current time difference with a required transmission time.

A preamble selection may indicate, for example, a WTRU buffer status. A WTRU may select a preamble, for example, based on its buffer status for one or multiple logical channels, logical channel groups, data types or the like. A preamble may be associated with a range for a buffer status. A WTRU may make a selection based on comparison with this range, in an (e.g. another) example, a WTRU may select a preamble based on whether the WTRU's buffer status for a logical channel may exceed an allowable transmission size for a data part of the preamble data transmission. A WTRU may select a preamble as a function of a request for a grant in the eRAR.

A preamble selection may indicate, for example, WTRU identity. A WTRU may select a preamble, for example, based on an identity at the WTRU. An identity may be preconfigured (e.g. GUTI) or provided by a network (e.g. C-RNTI or IMSI). An ID may be provided by a network, for example, during a state transition by the WTRU (e.g. when moving from connected to lightly connected or IDLE). An ID may be entirely or may contain a portion randomly selected by the WTRU. An ID may depend on a WTRU state (e.g. IDLE, connected or light connected state).

A preamble selection may indicate, for example, a location and/or numerology of a data transmission. A WTRU may perform selection of the time/frequency resources and/or numerology for transmission of the data. A WTRU may select a preamble associated with a location and/or numerology. A WTRU may determine a diversity or reliability for the data portion and may select a preamble associated therewith. For example, a preamble may map to data resources that enable repetition over frequency, time, space or code.

A preamble selection may indicate, for example, MCS. A WTRU may select a preamble based on an MCS it may use for transmission of associated data.

A preamble selection may indicate, for example, random selection. A WTRU may perform random selection of a preamble from a configured set of preambles, or from a set of preambles that may meet one or more (e.g. a combination of) other rules for preamble association.

A preamble selection may indicate, for example, a demodulation configuration of a data transmission. A WTRU may select a preamble, for example, based on a demodulation configuration of a data transmission. In an example, a preamble may be configured to be used as a demodulation reference signal (DMRS) for a data transmission. In an example, use of a preamble as a DMRS for a data transmission may reduce signaling overhead and may increase data transmission capacity. For example, a WTRU may select a long preamble sequence, e.g., to provide more accurate frequency and error correction at TRP receiver. A set of reference preamble numerology may be preconfigured for a WTRU to use, for example, when a preamble may be used for a channel estimate for data transmission. A WTRU may match a preamble configuration with a data transmission, e.g., including, for example, numerology, frequency allocation, beamforming configuration, etc. A WTRU may (e.g. alternatively or additionally) select a pre-configured demodulation reference signal (DMRS) for a data transmission. A WTRU may select a short preamble sequence at a different frequency resource allocation without consideration of using transmission parameters compatible with those of the data transmission.

Figure 7:
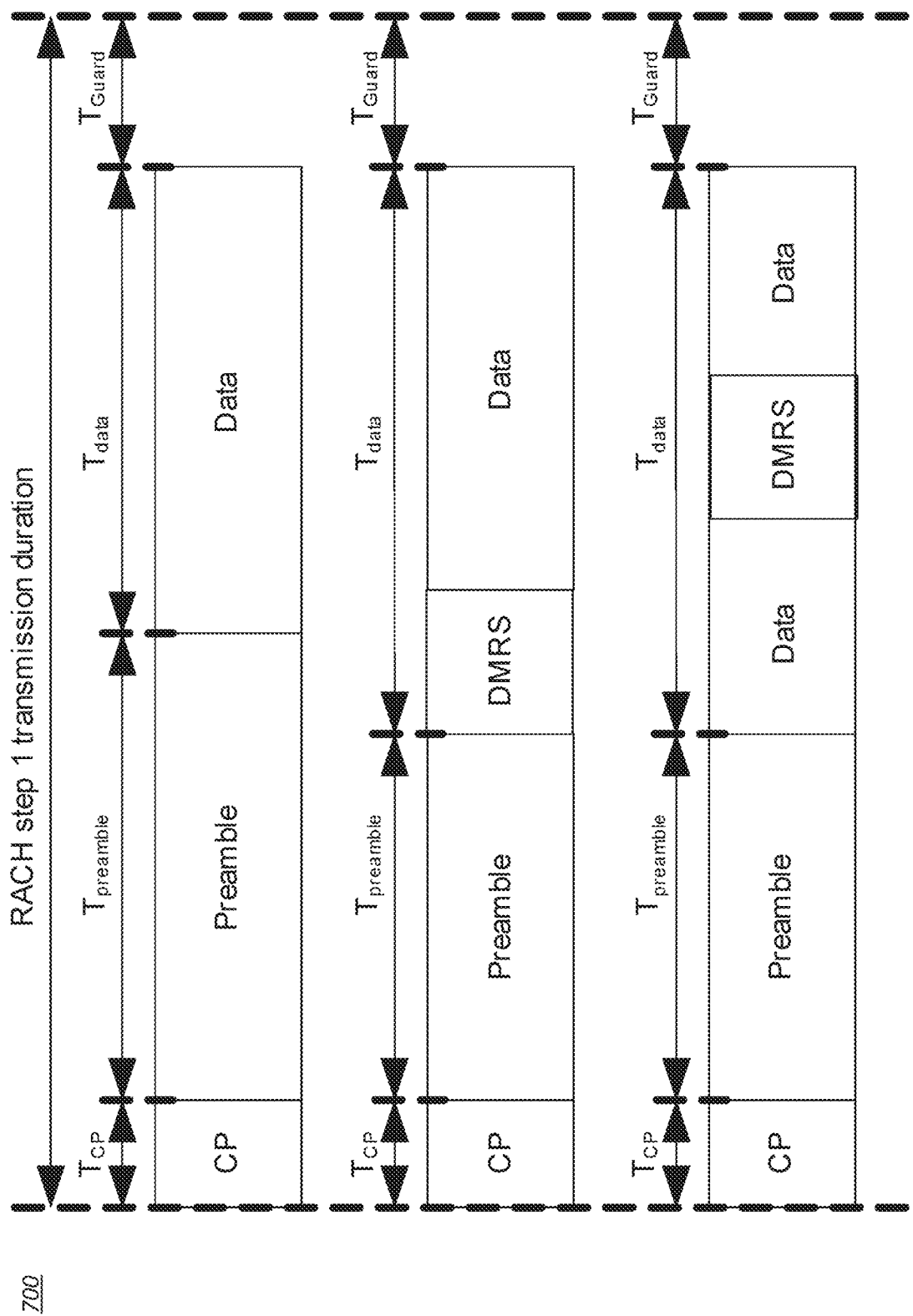
FIG. 7 is an example of a demodulation configuration.

FIG. 7 is an example of a demodulation configuration 700. As shown in FIG. 7, the WTRU may use the preamble as a DMRS for a data transmission. The WTRU may send a DMRS before the data transmission. The WTRU may send a DMRS during the data transmission.

A preamble selection may indicate, for example, a preamble receiving node. A WTRU may be configured or based on a downlink transmission transmit a preamble may have intended for a TRP or a group of TRPs. In an example deployment, a cell may consist of a group of TRPs that may collectively provide initial access coverage of a cell in a manner of SFN. A WTRU may select a preamble according to a cell-specific configuration with properties or characteristics that may optimize RACH reception performance at (e.g. each) individual TRPs. In an example, a WTRU may select a preamble that may consist of a number of repeated short sequences. This may improve uplink RACH link performance, for example, because a TRP may use receiver beamforming and may receive part or all of a short sequence in one or multiple receive beams. A TRP may (e.g. also) apply coherent combining of short sequence versions received in multiple receive beams. In an (e.g. another) example, a TRP may use a wide receive beam. The WTRU may select different transmit beamforming configuration for each short sequence, e.g., to provide a beamforming gain to the preamble transmission. A WTRU may (e.g. when it may transmit a preamble to a specific TRP) select a (e.g. one) long preamble sequence, e.g., to provide high energy accumulation of the preamble detection by the targeted TRP.

A preamble selection may indicate, for example, a request for transition to RRC CONNECTED. A WTRU transmitting eRACH while in inactive state may indicate (e.g. based on a preamble selection or associated resources), for example, whether the WTRU would like to transition to RRC CONNECTED state (e.g. following the eRACH procedure) or remain in inactive state (e.g. to continue to transmit data using the eRACH procedure).

A preamble selection may indicate, for example, that the amount of data to be transmitted exceeds a maximum. A WTRU may select a preamble, for example, to indicate whether it can perform transmission of at pending data using the BRACH procedure. For example, an indication may allow the network to provide an additional UL grant in the eRAR.

A preamble selection may indicate, for example, a request for semi-persistent DL resources. A WTRU may indicate its preference to allocate DL resources (e.g. a finite set that may be allocated without a DL grant). Implicit allocation of DL resources may permit a network to provide application layer ACKs, for example, when the WTRU performs data transmission in inactive state for a prolonged period of time.

A preamble selection may indicate, for example, a number of requested grants. A WTRU may request additional grants from the network in the eRAR. For example, a WTRU may transmit SRB and DRB using separate resources following the transmission of eMSG2. A selected preamble may indicate the request by the WTRU.

A preamble selection may indicate, for example, a data format. A WTRU may indicate (e.g. as part of a preamble) a data transmission format, such as the type of MAC header used, the presence/absence of signaling (SRB), the amount of data associated with each bearer, etc. A format indication may reduce header overhead transmitted with the data part, which may increase resource efficiency.

A WTRU may (e.g. further) receive multiple preambles from a network (e.g. through RRC signaling) and may select a provided preamble, e.g., based on one or more properties.

In an example, which may be used in conjunction with other preamble selection, a WTRU may select its time/frequency resources for preamble transmission based on one or more rules for preamble selection. A WTRU may learn of an association between data transmission properties, WTRU information and preamble resources, for example, by preconfiguration or by network configuration (e.g. broadcast or dedicated signaling and/or from an access table).

Physical Random Access Resource Selection, e.g., PRACH or enhanced PRACH (ePRACH) may be provided. A Procedure with the same PRACH for both access procedures may be implemented. A WTRU may utilize a common set of resources for RACH (4-step) and eRACH (2-step) transmission. A WTRU may determine PRACH/ePRACH resources from system information, which may be associated with a specific synchronization sequence and/or from preconfigured information. For example, a frequency range and/or numerology for transmission of PRACH/ePRACH may be preconfigured in a WTRU while specific resource blocks (e.g. tune/frequency location) may be defined by system information.

Differentiation may be based on preamble sequence. A WTRU may select from a different set of preamble sequences, for example, based on the type of procedure. A first set of preambles (e.g. preamble group C) may be associated with ePRACH while one or more sets of preambles (e.g. preamble group A and B) may be associated with PRACH transmission.

Differentiation may be based on blind decoding of data by a network. A WTRU may (e.g. alternatively) utilize the same preambles for PRACH and ePRACH. A network may determine the use of ePRACH, for example, through the detection of data transmitted by the WTRU. A WTRU may (e.g. always) fall back to PRACH retransmission, for example, when there is a failure to receive eMSG1

A procedure may have separate PRACH/(e)PRACH resources for each of multiple access procedures. A WTRU may utilize a separate set of resources for PRACH and ePRACH. A WTRU may select resources associated with PRACH, for example, when it performs a legacy RACH procedure and may select resources associated with ePRACH, for example, when it performs a eRACH procedure Data resources may be selected, e.g., based on a preamble. A WTRU may select or determine data resources (e.g. time/frequency) and/or data transmission properties (e.g. numerology, MCS), for example, as a function of a selected preamble and/or a function of selected preamble resources. In an example, a WTRU may be configured with a defined mapping between a preamble sequence/preamble resources and data resources/data transmission properties.

For example, a WTRU may be provided with an overall set of usable data resources and a defined mapping (e.g. based on a table or list) between each preamble and the corresponding resource block(s) to be used. In an (e.g. another) example, resource block(s) within a provided set of overall resources may be indexed by a preamble sequence number or preamble index of the selected preamble.

A WTRU may obtain its overall set of usable data resources from one or more of the following, for example: (i) system information (e.g. broadcast or dedicated and/or on-demand), (ii) access table and/or (iii) PDCCH grant to a specific RNTI (e.g. resources may consist of contention-based resources provided dynamically by a network).

A WTRU may autonomously select resources, e.g., from a defined subset. For example, WTRU preamble selection may determine an allowable subset of resources and/or transmission properties that may be usable by the WTRU. A WTRU may select from this subset of resources and/or transmission properties based on one of more of the following: random selection, measurements or channel occupancy, amount of data to send and/or type of data.

In an example of random selection, a WTRU may randomly select a number of transport blocks that may allow it to transmit a pending message.

In an example of selection based on measurements or channel occupancy, a WTRU may perform measurements (e.g. in the DL) on allowable data resources that may be associated with a selected preamble. A WTRU may select resources that may have the best quality or the least channel occupancy. A determination of measurements or channel occupancy may consist of RSRP measurements, achievable diversity level of a channel (e.g. number of independent diversity paths enable efficient repetition), energy measurements, detection of occupancy by decoding of PRACH and/or other transmissions from other WTRUs.

In an example of selection based on an amount of data to send, a WTRU may select a number of resource blocks or the like based on the amount of data to send or data in its buffers (e.g. up to a maximum amount).

In an example of selection based on a type of data (e.g. QoS, service type, or logical channel), a WTRU may select its resources to associate a specific numerology (e.g. TTI) with a type of service to be used. Numerology may be associated (e.g. through signaling by a network) with a time/frequency location of a selected resource.

A WTRU may (e.g. further) provide an indication of selected resources as information in a preamble transmission and/or the data. A WTRU may format an indication, for example, as a bitmap of resource blocks selected by a WTRU for transmission.

A WTRU may include (e.g. in a data transmission or in a control region of the data) additional information, which may comprise one or more of the following, for example: (i) an amount of data transmitted and/or an MCS that may be used to transmit the data; (ii) HARQ information (e.g. HARQ process number, redundancy version, retransmission number, etc. that may allow a WTRU to maintain multiple HARQ processes for transmission (at least initially) through the procedure of preamble+data transmission); (iii) WTRU Identity; (iv) WTRU buffer status; (v) one or more synchronization sequence(s) (e.g. measured by WTRU); (vi) beam index or beam parameters used or to be used by the WTRU (e.g. for future transmissions); (vii) desired format or desired information in the eRAR (e.g. WTRU may request a UL grant to be sent in the eRAR); (viii) QoS Requirements of the data; (ix) measurements of reference or synchronization signals during/prior to transmission of the preamble+data and/or (x) state transition request (e.g. from IDLE to connected or from light connected to connected) or a request to stay in the current state. For example a WTRU may have a short data burst and may indicate to the network that it may not expect a MSG2 to include anything other than a HARQ A/N (e.g. the WTRU may not receive TA command or a grant for a future transmission and upon reception of ACK may return to a non-timing-aligned mode).

Information, for example, may be included in a MAC CE or RRC message that may be sent with a data transmission.

A WTRU may determine an allowable MCS or an MCS to use for data transmission, for example, based on the selected preamble. A WTRU may determine an MCS based on one or more (e.g. a combination) of any of the following: network signaling, a property of a signature sequence or synchronization signal, a property of a timing alignment state, a predefined table of transport format/MCS and/or an eRACH trigger.

In an example of a determination by network signaling, a WTRU may receive an MCS to be used for a data transmission based on broadcast or dedicated network signaling.

In an example of a determination from a property of a signature sequence or synchronization signal, a WTRU may determine an MCS based on a signal strength, for example, in combination with a type of signature sequence detected by the WTRU prior to trigger of the 2-step procedure. A WTRU may be configured with a mapping between a signature sequence type and/or strength and a corresponding MCS.

In an example of a determination from a property of a timing alignment state, a WTRU may determine an MCS, for example, based on the amount of time since the last reception of a timing advance command, from the size of the cell, the time of last UL transmission or combination thereof.

In an example of a determination based on a pre-defined table of transport format/MCS, a WTRU may determine an MCS based on a predefined or network configured table of allowable MCS. A WTRU may select from allowable MCSs in the table. A network may perform blind decoding, for example, to determine an MCS selected by the WTRU.

In an example of a determination based on what triggered the eRACH, a WTRU may select an MCS for data transmission, for example, using information in eMSG0, e.g., when triggered by a network and using information in broadcast signaling, e.g., when triggered autonomously by the WTRU (e.g. data arrival at the WTRU).

In an example, a WTRU may receive a mapping between a selected preamble and a corresponding MCS for data transmission. A WTRU may use an MCS for data transmission, which may be associated with the preamble. In an (e.g. another) example, preambles may have a restricted range of MCS associated with them. A WTRU may select a specific MCS within a restricted subset, for example, based on measurements of a signature sequence or a synchronization signal that may be performed prior to initiation of the two-step procedure.

A WTRU may determine certain properties of the data transmission based on presence of and information carried in a control channel. Preamble and data may be aligned with transmission of a control channel in the DL. A control channel may carry information about a data transmission, such as: (i) frequency/time/code resource allocation; (ii) numerology, (iii) MCS and/or (iv) modulation.

A WTRU may decode a control channel based on, for example, a specific group RNTI, e.g., to determine such properties. An RNTI may be preconfigured in a WTRU or may be specific to a category/type of WTRU (e.g. RNTI per WTRU type) or service requested by the WTRU.

Transmission of data with lack of timing advance may cause interference and may make it difficult for a network to receive transmissions.

Guard periods may be selected. A WTRU may transmit its data within an allocated resource for data transmission. A guard period may be used prior and/or after data transmission. A WTRU may select from a set of guard period durations or guard period configurations, for example, based on its environment or timing alignment status. This may include selecting a guard period that may correspond to or may be associated with one or more (e.g. a combination) of the following, for example: (i) cell size and/or WTRU speed; (ii) timing alignment status (e.g. time since the WTRU was last time aligned) and/or (iii) WTRU measurements (e.g. for reference signal, signature sequence or synchronization signal).

A WTRU may make a selection from a list of configured guard period configurations, which may have a predefined or configured association, e.g., as discussed above. A WTRU may (e.g. alternatively) receive its guard period configuration from the network.

A WTRU may transmit a known sequence within a portion of a guard period. A sequence may consist of a cyclic prefix or a sequence that may be related to (or a function of) a selected preamble. The duration of a sequence may be related to a guard period configuration. For example, a duration of a sequence may be a specified fraction of a guard period duration.

A sequence may allow a network to detect the start of transmission by a WTRU within an allocated resource.

Numerology selection may be provided. A WTRU may select a large CP for a first PRACH transmission. A PRACH format may include CP and GP. Subcarrier spacing may be based on a downlink channel in which a RACH configuration may be received. This may avoid interference between different WTRU preamble transmissions, e.g., even with different preamble sequences.

Interference avoidance and management may be provided. Multiple WTRUs may select an identical preamble, which may result in a preamble collision and data transmission interference with each other, in an example, a WTRU may bear form a step-1 transmission, e.g., to reduce a collision. A TRP may receive two identical preambles in two separate receive beams and there may be no interference for a data part of the transmission. A WTRU may select a step-1 transmission beamforming configuration, for example, based on beam sweeping, random beam selection or DL/UL channel reciprocity, e.g., using downlink reception angle of arrival information.

Additional MAC CEs may be transmitted. A WTRU may transmit (e.g. along with the data transmission) one or more MAC CEs, MAC CEs may (e.g. additionally) contain information (e.g. that may be provided with the preamble), for example, when the information has not already been included with the preamble.

A WTRU may initiate a retransmission procedure (e.g. for eMSG1), for example, upon a failed 2-step access or failed data transmission. A retransmission may be triggered, for example, by one or more of the following events: (i) a WTRU may not receive a valid eRAR over a defined or expected period of time; (ii) a WTRU may receive an eRAR with a WTRU ID that may not match the WTRU's own ID; (iii) a WTRU may receive an eRAR intended for it with a HARQ process state corresponding to NACK and/or (iv) a WTRU may receive an eRAR intended for it with a HARQ process state corresponding to ACK but an NDI indicating no new data transmission (e.g. adaptive retransmission).

A WTRU retransmission may perform, for example, one or more actions.

In an example (e.g. when a valid eRAR may not have been received or a received eRAR may not have a matching WTRU ID), a WTRU retransmission may, for example: (i) repeat preamble selection and data transmission in the first step of the 2-step process; (ii) repeat the first step of the 2-step process utilizing the same preamble, preamble resources and/or data resources; (iii) increase transmission power on preamble and/or data transmission; (iv) initiate a 4-step procedure (i.e. transmit only preamble); and/or (v) repeat preamble selection and data transmission in the first step of the 2-step preamble, with or without employing a different set of or subset of preambles or a different selection criteria for preamble/data resources. For example, a WTRU may select from a more robust set of preambles following a failed preamble+data transmission. A more robust set of preambles may correspond to transmission of data in a different numerology block, different frequency range, using different WTRU encoding, etc.

In an example (e.g. when a valid eRAR may have been received with NACK on data or ACK and NDI=0), a WTRU retransmission may, for example: (i) perform retransmission of data only, e.g., using a TAC provided in an eRAR; (ii) perform retransmission of data, with or without another redundancy version associated with the data, which may be indicated in the eRAR or based on a pre-defined sequence; (iii) modify the guard interval configuration for retransmission of preamble+data; (iv) perform retransmission of data only, e.g., re-utilizing the same data resources as the initial transmission, with or without retransmission of the preamble; (iv) perform retransmission utilizing UL grant, which may be provided in the eRAR; (v) modify the MCS used for data transmission to use the MCS provided by the grant; (vi) scale the MCS by a specific amount (e.g. a scaled MCS may be determined based on the ability to retransmit data on a resource without the need for a guard interval) and/or (vii) reset its TA timer and assume it is currently timing aligned.

In an example, a WTRU may perform retransmission of preamble+data (e.g. repeat 2-step process) under one or more of the following occurrences: (i) the WTRU may not receive an eRAR within the expected time period; (ii) the WTRU may receive an eRAR with a WTRU ID that may not match the WTRU's own ID or the ID transmitted by the WTRU during the 2-step process and/or (iii) the WTRU may receive an eRAR that may be intended for it with a HARQ process state corresponding to NACK (non-adaptive retransmission).

A WTRU may (e.g. further) modify a guard interval configuration for retransmission of preamble+data, for example, as a result of requiring a retransmission, e.g., where the WTRU may have received a valid TAC in the eRAR. In an example, a WTRU may perform retransmission of preamble+data without a guard period, for example, when the WTRU may receive an eRAR that may be intended for it, e.g., where NACK and a valid TAC may be received without a UL grant.

In an (e.g. another) example, a WTRU may receive a valid eRAR that may contain NACK (or ACK with NDI=0) and a UL grant, e.g., including MCS, resources, etc. The WTRU may retransmit the data part (which may have been initially transmitted in the preamble+data), for example, using the provided grant. A UL transmission may (e.g. also) be performed by the WTRU, for example, using UL timing provided in an eRAR.

In an (e.g. another) example, a WTRU may receive a valid eRAR that may contain a NACK without UL grant information in the eRAR. The WTRU may retransmit the data (e.g. without a preamble), for example, using the same resources selected for the data part in the initial transmission. Resources may be located in a subframe/frame whose timing may depend on reception timing of an eRAR. A WTRU may (e.g. further) determine that resources may be dedicated for its own transmission (e.g. non-contention-based). A WTRU may (e.g. further) transmit in such resources without the use of guard interval and may compensate for the lack of guard interval, for example, by performing one or more of the following: (i) increasing coding (e.g. changing MCS) so the UL transmission may occupy an entire time duration of the resource; (ii) transmitting an additional (e.g. new TB) with the original (e.g. retransmitted) TB using the same resource and/or (iii) transmitting in a subset of the resources (e.g. where the subset may be indicated by the eRAR). For example, a WTRU may transmit over a first slot of a multi-slot resource or may transmit over a known subset of resource blocks associated with the initial resource.

An enhanced Message 2 (eMSG2/eRAR) may be provided. A WTRU may (e.g. following a transmission that may include a preamble) receive an enhanced random access response (eRAR) from a network.

An eMSG2 reception procedure may include an eRAR reception procedure. A WTRU may perform decoding for an eRAR, e.g., following transmission of eMSG1. A WTRU may determine successful reception of an eRAR, for example, when an eRAR may be successfully decoded at an expected or defined time and/or within a specific time interval. A WTRU may initiate a failure procedure, such as retransmission procedure, for example, when an eRAR may not be successfully decoded at a specified time or during a specified eRAR reception window.

In an example, an eRAR may be received by a WTRU at a specific time (e.g. subframe, slot, mini-slot).

A WTRU may determine eRAR reception time based on one or more (e.g. a combination) of the following, for example.

A WTRU may determine eRAR reception time, for example, based on a time from transmission of preamble/ data. A WTRU may determine eRAR reception time based on (e.g. number of subframes following) the transmission of the preamble and/or data. A time may be preconfigured in the WTRU or configured by a network.

A WTRU may determine eRAR reception time, for example, based on a selected preamble. An eRAR reception time may depend on a selected preamble sequence, which may relate to the type of transmission performed by the WTRU. For example, a WTRU may determine an eRAR reception time to be a specific time following transmission of a preamble, where that time may be different depending on the selected preamble. A WTRU may expect a shorter time delay until reception of the eRAR, for example, for low-latency data transmission, which may be indicated by a selected preamble.

A WTRU may determine eRAR reception time, for example, based on resources selected by the WTRU. A WTRU may determine an eRAR reception time as a function of the resources selected for transmission of a preamble and/or data.

A WTRU may determine eRAR reception time, for example, based on reception of a synchronization symbol. A WTRU may determine an eRAR reception time based on the timing of one or more synchronization symbols that may be received from a network. For example, a WTRU may compute an RAR reception time as a time window starting from reception of a synchronization symbol that may be measured by the WTRU, e.g., with the best or suitable measurements.

A WTRU may determine eRAR reception time, for example, based on a WTRU ID. A WTRU may determine an eRAR reception time as a function of a WTRU ID, e.g., transmitted as part of an initial preamble+data transmission.

A WTRU may determine eRAR reception time, for example, based on a type of data/service transmitted by a WTRU. A reception time of an eRAR may be specific to or may depend on the type of data/service that may be transmitted by the WTRU, which may be identified by the WTRU in a data transmission, e.g., based specific control information, transmission properties of the data or selection of preamble sequence, resources, etc.

These examples alone or in any combination may permit a network to distribute the load for eRAR transmission, such as in situations where multiple WTRUs may have an eRACH procedure triggered simultaneously. These examples alone or in any combination may allow prioritization of eRAR, e.g., for low-latency transmissions over eRAR for non-time-critical transmissions. A WTRU may move to power-saving state during a period between preamble+data transmission and eRAR reception, for example, when it is aware of a longer time period between the two.

In an example, an eRAR reception time may be specific to or may depend on the type of data/service being transmitted by WTRU. A WTRU may expect an eRAR to be sent at a fixed time instant or during a configurable window of time following eMSG1 transmission. A time may be determined, for example, by the type of data that may be transmitted by the WTRU in the first step (preamble+data transmission). The data type may be indicated by the WTRU, for example, using a MAC CE, which may be transmitted with the data (e.g. by indication of a data type, logical channel, or similar field).

A WTRU may expect eRAR to be repeated in multiple resources (e.g. in time, frequency, space or code). This may enable a WTRU to use Chase combining or incremental redundancy of the eRAR, e.g., for improved reliability and error avoidance (e.g. when a WTRU erroneously assumes no eRAR was transmitted). This may (e.g. for URLLC scenarios) avoid multiple unnecessary RACH procedures. An eRAR may provide a UL grant or DL assignment for a subsequent transmission. An eRAR may be retransmitted multiple times in the time domain. A UL grant or DL assignment portion of an eRAR may change for each repetition. This may enable a WTRU (e.g. that may correctly detect and decode eRAR before all retransmissions are completed) to perform UL or DL transmission more quickly.

A WTRU may expect an eRAR based on a reception window (or period of time). The starting time for a window may be determined, for example, based on one or more previously described determinations for reception of eRAR at a specific time and/or based on one or more other determinations.

A reception window length may be determined, for example, based on configuration. A reception window may be determined, for example, based on network configuration or may be preconfigured at the WTRU.

A reception window length may be determined, for example, based on network load (e.g. measured or signaled). A WTRU may determine a length of an eRAR reception window, for example, based on a current network load. For example, a WTRU may determine a network load from an indication from the network. A WTRU may (e.g. also) determine a network load based on measurements of a medium (e.g. energy detection, sensing), which may be combined with measurements used to access the medium for eMSG1 transmission. A procedure may be applicable for operation in unlicensed spectrum, for example. A WTRU may (e.g. further) determine reception window length as a (e.g. predefined or configured) function of a network load.

A reception window length may be determined, for example, based on a synchronization sequence. A WTRU may determine the length of a reception window, for example, based on a synchronization sequence detected by the WTRU. For example, a determination may be made by a WTRU based on the identity of synchronization sequence. A synchronization sequence may correspond to a sequence with the largest received power at a WTRU. The identity of a sequence may be encoded, for example, using sequence pattern, timing and/or other physical properties associated with the sequence. A WTRU may determine reception window length, for example, using a lookup table of reception window length associated with synchronization sequence identity. A lookup table may be preconfigured in a WTRU, configured by network signaling or may be part of an access table obtained by the WTRU from a network.

A reception window length may be determined, for example, based on beam properties of synchronization sequence reception or eMSG1 transmission. A WTRU may determine a reception window as a function of beam properties at a WTRU used for detecting a synchronization sequence. For example, a WTRU may perform beamforming/beamsweeping to detect a synchronization sequence. A WTRU may determine an eRAR reception window length, for example, as a (e.g. preconfigured or network configured) function of the beam angle at the WTRU for synchronization reception. A WTRU may (e.g. alternatively) compute reception window length as a function of beam sweeping parameters of an eMSG1 transmission.

An eRAR may be received by a WTRU by decoding one or more control channels defined for a cell/TRP and/or associated with a synchronization sequence. A WTRU may receive an eRAR, for example, through a downlink assignment addressed through DCI to the WTRU or to a group of WTRUs.

A WTRU may decode a control channel, for example, using an RNTI that may be specific to a cell/TRP/synchronization sequence. An RNTI for decoding eRAR may be determined by a WTRU based on one or more of the following.

An RNTI for decoding eRAR may be determined based on, for example, an RNTI preconfigured in the WTRU.

An RNTI for decoding eRAR may be determined based on, for example, an RNTI received from system information. For example, a WTRU may determine an RNTI to decode for reception of eRAR from system information provided by the cell/TRP.

An RNTI for decoding eRAR may be determined based on, for example, an RNTI associated with synchronization sequence. A WTRU may determine RNTI from a synchronization sequence or identity encoded in a synchronization sequence. A WTRU may use an RNTI that may be the same as a synchronization sequence identity or a sub-portion of the synchronization sequence identity. A WTRU may (e.g. alternatively) determine RNTI as a preconfigured function of a synchronization sequence.

An RNTI for decoding eRAR may be determined based on, for example, an RNTI derived from preamble sequence. For example, a WTRU may use a preamble sequence (e.g. transmitted in eMSG1) or a portion thereof, as the RNTI.

An RNTI for decoding eRAR may be determined based on, for example, an RNTI derived from selected preamble/data resources. A WTRU may determine an RNTI based on resources selected for a preamble and/or data transmission, A mapping of resources (e.g. frequency location, resource block index, subframe number or similar) may be provided to a WTRU or preconfigured in a WTRU. A WTRU may derive its RNTI from such a mapping and the selected preamble/data resources for eMSG1.

An RNTI for decoding eRAR may be determined based on, for example, an RNTI based on WTRU ID. For example, a WTRU may use, e.g. as RNTI, an identity transmitted by the WTRU during eMSG1 or provided to the WTRU (e.g. through network order or eMSG0).

In an example, a WTRU may determine RNTI as a function of a preamble sequence and selected resources for transmission of a preamble. A first set of bits of the RNTI may correspond to a certain number of bits of the preamble. A second set of bits of the RNTI may be associated with selected resources. In an example, resources for a transmission of the preamble may be identified, for example, using sequential numbering, e.g., in terms of increasing frequency and/or time (e.g. for a specific subframe, frame, frequency band, etc.) and may be used by the WTRU to determine the second set of bits. A third set of bits in the RNTI may be a preconfigured sequence.

A WTRU may receive eRAR reception while decoding one or more control channels. A WTRU may determine a specific control channel (e.g. when there may be multiple control channels) or specific resources of a control channel (e.g. CCE, subband, frequency block or similar) on which an eRAR may be received. A subset of resources may be determined by the WTRU, for example, based on one or more of the following.

A subset of resources may be determined, for example, based on a preamble sequence and/or resources selected by a WTRU. For example, a WTRU may select control channel resources to perform decoding for eRAR based on a function of a selected preamble, the resources used to transmit the preamble and/or additional service-related information that may be sent during transmission of the preamble and data. For example, a WTRU may select control channel resources associated with a reference numerology block or for a numerology block associated with a type of service requested during transmission of preamble+data.

A subset of resources may be determined, for example, based on a synchronization sequence detected by a WTRU. A WTRU may select (e.g. based on a pre-defined or configured rule) control channel resources that may be associated with the best synchronization sequence detected by the WTRU, e.g., prior to or during performance of the first step of the 2-step procedure. For example, a WTRU may determine a time/frequency location of control channel resources based on a relationship between synchronization sequence timing/frequency and its corresponding control channel resources.

A subset of resources may be determined, for example, based on a current connection: A WTRU may (e.g. alternatively) receive eRAR on specific control channel resources that may be defined for eRAR reception for a specific cell/TRP/set of beams the WTRU may be currently connected to when it performs transmission of data+preamble.

Reducing the expected frequency range (decoding range) for eRAR reception may provide significant power savings for WTRUs that may be transmitting only occasionally and may use the 2-step procedure continually to perform their transmission. For example, randomization of resources on which eRAR may be sent (e.g. by having it depend on the selected preamble, which may be selected partially randomly) may result in significant power savings for a WTRU without reduction in network scheduling flexibility for eRAR.

eRAR may be received with specific beam parameters. A WTRU may receive eRAR on any downlink beam transmitted by the network.

A WTRU may (e.g. alternatively) receive eRAR using beam parameters that may be a function of its eMSG1 transmission. A WTRU may determine its beam parameters based on one or more of the following:

A WTRU may determine its beam parameters, for example, based on preamble, preamble resources and/or data resources selected/used by the WTRU during transmission of eMSG1.

A WTRU may determine its beam parameters, for example, based on transmission parameters of data transmitted in eMSG1 (e.g. MCS, TB size, estimated transmit power).

A WTRU may determine its beam parameters, for example, based on beamforming parameters applied for the preamble or data transmission used for eMSG1. A WTRU may receive eRAR, for example, in a downlink beam at an angle of arrival (AoA) close to or overlapping with the angle of departure (AoD) of the uplink eMSG1 transmission where the may be expected.

A WTRU may determine its beam parameters, for example, based on properties or parameters of a downlink beam in which a WTRU may receive a configuration related to an eMSG1 transmission where the eRAR may be expected. In an example, a WTRU may monitor eRAR, for example, using an identity based on a downlink beam index, eMSG1 transmission slot or sub-frame number and/or frequency allocation index. This may (e.g. further) reduce contention of the procedure, for example, when only WTRUs that received eMSG transmission configuration within the same beam (e.g. not the same cell) may monitor the eRAR.

An eRAR may include one or more types of information.

An eRAR may include, for example, an identifier (or equivalent). An eRAR may contain an identifier that may provide an indication of the identity of WTRUs that may be detected to have transmitted eMSG1. This may consist of an echo of the preamble or a portion of the preamble or indication whether contention was detected for a specific preamble.

An eRAR may include, for example, HARQ Feedback. An eRAR may contain HARQ feedback for data (e.g. ACK/NACK). Feedback may be explicit, such as a bit or field in a MAC CE that may be included in the eRAR. HARQ feedback may be implicitly indicated by, for example, the presence of other fields or information. For example, the presence of a UL grant may implicitly specify a NACK.

An eRAR may include, for example, uplink timing information (e.g. a Timing Advance Command (TAC) or an indication whether the WTRU is timing aligned).

An eRAR may include, for example, one or more downlink assignment(s). An eRAR may contain (e.g. as a MAC CE) one or more downlink assignments for DL data destined for the WTRU, e.g., including MCS, HARQ process number, resources, timing, etc.

An eRAR may include, for example, information enabling reception of a downlink assignment. An eRAR may contain information enabling subsequent or further reception (e.g. by a WTRU) of downlink assignments, such as an RNTI, specific time/frequency location of a DCI, specific control channel on which the WTRU may perform additional decoding for DL assignments, etc.

An eRAR may include, for example, one or more uplink grant(s). An eRAR may contain one or more UL grants, e.g., including MCS, resources, HARQ process number, redundancy version, power control, etc. An eRAR may (e.g. also) indicate whether a UL grant may be used for retransmission of data in eMSG1 (e.g. including RV) or whether the grant may be used for transmission of new data. An indication may be supported, for example, using an NDI, and may serve as implicit indication of ACK/NACK (e.g. NDI=1 may signal ACK and grant assumed for new data transmission). An indication whether retransmission may be needed may be provided based on TB size (e.g. when the TB size for the grant matches the initial data size, is a predefined size used to signal retransmission or is a predefined function of the initial data TB size that specifically signals retransmission).

An eRAR may include, for example, contention-resolution information. An eRAR may contain an indication whether a contention (e.g. during transmission of eMSG1) was detected and may indicate information to be used by the WTRUs in question to resolve the contention. This may consist of information contained in a WTRU's transmission, such as a WTRU ID that may have been transmitted by the WTRU in eMSG1. Information may (e.g. also) consist of an echo of a portion of the data transmitted by the WTRU, e.g. when successfully decoded. Information may (e.g. also) consist of an indication of a detected transmit power/path loss/antenna parameters/beamforming parameters that may be associated with a WTRU's transmission (e.g. determined from decoding eMSG1 from the WTRU).

An eRAR may include, for example, backoff information. An eRAR may contain a backoff time or backoff instructions (e.g. perform 4-step PRACH procedure instead). A WTRU may delay retransmission of eMSG1, retransmission of data, or may be redirected to using PRACH as a result of receiving such information.

An eRAR may include, for example, an indication whether to initiate an RRC CONNECTION procedure. An eRAR may contain an indication to a WTRU whether it should initiate an RRC CONNECTION procedure, for example, by transmission of an RRC ConnectionRequest message. A WTRU may transmit a message, for example, using a provided UL grant in the eRAR. An indication whether to remain in the inactive state or transition to RRC CONNECTED may (e.g. alternatively) be determined implicitly through the use of other information. For example, a WTRU may determine that it may remain in an inactive state in the absence of a UL grant in the eRAR combined with an ACK. A WTRU may initiate an RRC Connection, for example, in the presence of a UL grant and ACK.

Contention resolution may be provided, e.g., following eRAR reception. A WTRU may receive eRAR on a control channel (e.g. PDCCH or similar) by decoding the message using a WTRU identifier. In an example, a WTRU may use an ID to decode PDCCH, which may correspond to an ID sent, at least in part, by the WTRU during transmission of preamble+data in the first step. A WTRU may compute the ID for decoding of PDCCH using one or more of: (i) all or part of the preamble sequence; (ii) a function of the resources selected for transmission of the preamble and/or the data; (iii) all or part of an explicit WTRU identifier transmitted as part of the data during preamble+data transmission (e.g. in a MAC CE included with data transmission); (iv) a permanent ID configured in the WTRU and/or (v) an identifier that may correspond to a signature sequence or reference sequence detected/measured by the WTRU prior to transmission of preamble+data.

In an (e.g. alternative or additional) example, which may be used in combination with other examples, a WTRU may determine that it is the intended recipient of the eRAR, for example, by determining whether an ID present in the payload of the eRAR contains a part or all of the transmitted ID. Decoding of PDCCH may be made on a generic ID (e.g. RA-RNTI) or based on one or more elements described herein (e.g. preamble sequence, preamble/data resources selected).

In an example, a WTRU may (e.g. first) perform decoding of an eRAR message, e.g., using a first ID (ID1) and may search for a second ID in the eRAR payload (ID2). A WTRU may take action on the eRAR (e.g. update its HARQ buffers based on the received HARQ process state), for example, when the combination of ID1 and ID2 matches the ID transmitted by the WTRU in the preamble+data transmission.

In an (e.g. another) example, a WTRU may decode PDCCH, for example, using an ID that may be derived from, or directly related to, the selected preamble sequence and/or preamble resources. A WTRU may (e.g. then) determine whether the eRAR is intended for it, for example, by determining whether the ID included in the payload matches (e.g. in whole or in part) a permanent ID configured at the WTRU.

HARQ feedback may be provided. A WTRU may receive, in the eRAR or through other signaling (e.g. related to the eRACH procedure), HARQ feedback from the network for the data transmitted in eMSG1. Feedback may consist of, for example HARQ ACK/NACK, a HARQ process number identifying the HARQ process being acknowledged and/or a redundancy version indicating the code-block required for retransmission.

HARQ feedback may be explicit. A WTRU may receive HARQ feedback (e.g. a bit whose value indicates ACK or NACK, or a value of HARQ process number), for example, in the eRAR or signaling associated with reception by the WTRU of the eRAR.

HARQ feedback may be indicated, for example, as a flag or field in a MAC CE transmitted in the eRAR. A WTRU may receive (e.g. as part of or as eRAR itself) a MAC CE that may contain one or more explicit fields for HARQ feedback. For example, a WTRU may receive an ACK/NACK bit and/or an NDI. In an example, a WTRU may receive ACK, for example, when the ACK/NACK field may be set to 1 and/or the NDI field may be set to 1. In an example, a WTRU may receive NACK, for example, when the ACK/HACK field is not present and the NDI is set to 0. Other combinations of fields are contemplated.

HARQ feedback may be indicated, for example, in DCI on (e)PDCCH. A WTRU may receive HARQ feedback in the DCI used to signal DL allocation for the eRAR. For example, a WTRU may receive HARQ feedback with specific fields in the DCI. Alternatively, or in conjunction, all or part of the HARQ feedback may be indicated based on the specific (set of) CCE(s), search space, RNTI, or the like in which the DCI may be decoded by the WTRU. For example, a WTRU may receive a HARQ process number based on CCEs used to decode the DCI or a specific search space in which eRAR was received.

HARQ feedback may be indicated, for example, in higher layer messaging. A WTRU may receive (e.g. as part of or as the eRAR itself) a transport block containing control signaling (e.g. RRC), which may contain a (e.g. explicit) message or indication of HARQ ACK/NACK (e.g. an RRC message).

Explicit HARQ feedback may be associated with other signaling. In an example, a WTRU may receive explicit HARQ feedback on signaling other than the eRAR.

A WTRU may receive explicit HARQ feedback, for example, using a separate dedicated control channel. A WTRU may receive HARQ feedback from a control channel or control channel resources dedicated for transmission of HARQ feedback, which may be associated with eRACH HARQ feedback. The time/frequency location of a dedicated resource may be indicated to a WTRU, for example, through broadcast or dedicated signaling. In an example, a PHICH-like resource element for transmitting ACK/NACK may provide an indication, where the specific resource used may further signal the HARQ process number.

A WTRU may determine a time/frequency location of HARQ feedback resources, for example, based on properties of a eRACH procedure. For example, a WTRU may determine the time/frequency location of control resources for HARQ feedback as a function of: (i) a selected preamble, selected preamble resources and/or selected data resources; (ii) a WTRU's identity, such as its C-RNTI, RA-RNTI or similar and/or (iii) the timing of a transmitted preamble and/or data resources.

A WTRU may receive explicit HARQ feedback, for example, using a separate DCI message. A WTRU may receive ACK/NACK, for example, using a separate DCI message (e.g. other than the one received for eRAR). The timing of a DCI message may be related to the timing of reception of an eRAR message. For example, a WTRU may receive a DC message containing ACK/NACK on the same or subsequent subframe, slot or mini-slot.

Implicit HARQ feedback may be provided, for example, by presence/lack of messaging associated with eRAR. In an example, a WTRU may receive HARQ feedback implicitly based on the presence/absence of eRAR or message/field associated with the eRAR.

In an example, a WTRU may assume ACK, for example, when it receives eRAR (e.g. based on decoding with the associated C-RNTI or RA-RNTI, as applicable).

In an (e.g. another) example, a WTRU may assume ACK, for example, when it receives eRAR, which may contain an identity that may match the WTRU ID transmitted in eMSG1. A WTRU may assume NACK, for example, when it does not receive eRAR or when it receives eRAR with an identity in the eRAR that may not match the WTRU ID transmitted in eMSG1.

In an (e.g. another) example, a WTRU may assume NACK, for example, when it receives a grant in the eRAR that may be associated with (i) a HARQ process number of the data transmission in eMSG1, which may be pending (e.g. assuming single parallel eMSG1 data transmissions), or (ii) a HARQ process number associated with the data transmission in an eMSG1 that may have occurred in a specific number of subframes, slots, mini-slots, e.g., prior to the reception of the eRAR.

Upon determination of a HARQ ACK, the WTRU may perform the procedure associated with successful completion of the eRACH procedure as described herein. A WTRU may further perform uplink transmission on the associated grant received (if such grant is included in the eRAR) based on the rules associated with that grant. Specifically, the WTRU may perform transmission based on the MCS and HARQ process ID associated with the grant.

A WTRU may (e.g. for HARQ NACK) perform one or more procedures, for example, in all cases (e.g. upon initial reception of NACK) or depending on one or more conditions, such as example conditions indicated herein.

A WTRU may perform retransmission of eMSG1, for example, when one or more of the following conditions exists: (i) the WTRU determines a HARQ NACK and eMSG1 contain no grant; (ii) the WTRU determines a HARQ NACK following its maximum number of HARQ retransmissions for data in eMSG1 (which may be configured or fixed for a specific WTRU); (iii) the WTRU determines a HARQ NACK and frequency of operation, preamble sequence utilized, synchronization sequence, or other indication that the NACK may require retransmission of eMSG1 and/or (iv) the above occurs and the number of retransmissions may be less than a maximum number of retransmissions for eMSG1 (which may be configured or fixed for a specific WTRU).

A WTRU may perform adaptive HARQ retransmission of the data portion of eMSG1, for example, when one or more of the following conditions exists: (i) the WTRU determines a HARQ NACK in combination with a UL grant for eMSG1 with or without a HARQ process ID in the grant that may match a HARQ process ID of an initial transmission and/or (ii) the above occurs and the number of retransmissions may be less than a maximum number of retransmissions for eMSG1 (which may be configured or fixed for a specific WTRU).

A WTRU may perform failure of the eRACH procedure, for example, when one or more of the following conditions exists: (i) the WTRU determines a HARQ NACK and the number of retransmissions has reached the maximum number of retransmissions for the data in eMSG1 and/or (ii) the WTRU determines a HARQ NACK and the number of retransmissions has reached the maximum number of retransmissions for the data in eMSG1.

A WTRU behavior may be based on a combination of information received from the ACK/NACK, UL Grant and a backoff indication.

A WTRU may perform HARQ retransmission or retry eRACH procedure (e.g. as described herein), for example, when a backoff indication is not provided.

A WTRU may receive an indication to perform backoff and an ACK may be received. A WTRU may perform subsequent data transmission based on a 4-step procedure and may move to connected state (e.g. when configured to do so). A WTRU may perform subsequent data transmissions based on 2-step procedure, for example, (e.g. only) when the next transmission occurs, e.g., after a configured or predefined time.

A WTRU may receive an indication to perform backoff and an NACK may be received. A WTRU may initiate an RRC connection, for example, when the WTRU is provided with a UL grant. The WTRU may use the UL grant to transmit an RRC Connection Request message. A WTRU may retransmit data, for example, by reusing the eRACH procedure, e.g., after waiting a configured or predefined time period. A WTRU may initiate a 4-step procedure (e.g. immediately), for example, when the QoS may require data to be transmitted with minimal latency.

Contention resolution may be provided. A WTRU may determine whether contention or collision occurred during transmission of eMSG1, e.g., through one or more procedures described herein. A WTRU may (e.g. in response to contention) initiate a contention resolution procedure, which may consist of a (contention-based or contention-free) data transmission, a retransmission of eMSG1 (potentially with different preamble resource/sequence selection) and/or a retransmission of the data part of eMSG1.

A WTRU may detect contention and may determine that it needs to initiate contention resolution as a result of one or more of the following:

A WTRU may initiate contention resolution, for example, based on HARQ A/N in eRAR for initial transmission. For example, a WTRU may determine from reception of a NACK, with or without additional information in the eRAR (e.g. a UL grant) that the WTRU may need to perform contention resolution.

A WTRU may initiate contention resolution, for example, based on reception of an eRAR with a specific RNTI. For example, a WTRU may determine the presence of contention based on the reception of an eRAR or similar message using an RNTI other than the RNTI for successful (e.g. no contention) case. In an example, a WTRU may determine the presence of contention, for example, when it receives a message using RA-RNTI instead of using C-RNTI.

A WTRU may initiate contention resolution, for example, based on reception of an eRAR with a specific RNTI. For example, a WTRU may determine the presence of contention based on the reception of additional grants (e.g. more than 1) in the eRAR.

In an example, a WTRU may perform contention resolution through a UL transmission indicating contention resolution. An uplink transmission may contain an identity of the WTRU. An uplink transmission may contain the data (e.g., retransmitted, potentially with a different redundancy version) in eMSG1. A transmission may occur, for example, based on a transmission using a grant in eRAR.

A WTRU may perform transmission associated with contention resolution, for example, by sending the contention resolution information (e.g. ID, retransmitted data, etc.) in the UL grant provided in the eRAR.

A WTRU may maintain a HARQ process state received in the eRAR during the contention resolution procedure. A WTRU may assume the HARQ process state received in the eRAR, for example, upon successful contention resolution (e.g. the WTRU may determine that eRAR was intended for it). A WTRU may delete/ignore the information in the eRAR, for example, for failed contention resolution.

A WTRU may perform (e.g. adaptive HARQ) retransmission for a data portion of eMSG1, for example, when the WTRU receives one or more UL grants in eMSG1.

A WTRU (e.g. upon reception of the eRAR) may perform retransmission of the data in eMSG1, e.g., using the MCS provided in the UL grant.

A WTRU may receive multiple UL grants in eRAR. A WTRU may select a UL grant used for adaptive retransmission of the data part of eMSG1, for example, based on one or more of the following: (i) selection of a specific grant (e.g. a WTRU may select a first grant in the eRAR); (ii) random selection of a grant (e.g. a WTRU may randomly select among the grants provided in the eRAR); (iii) indication of the HARQ process ID (e.g. a WTRU may select a UL grant containing a HARQ process ID matching a HARQ process ID of data in eMSG1 sent by the WTRU); (iv) comparison of grant size with data to be transmitted (e.g. a WTRU may select the grant that best suits data to be transmitted based on the MCS in the grant or accommodates retransmission of the data and minimizes the amount of padding to be transmitted) and/or (v) priority of the data (e.g. a WTRU may select a grant based on the priority of the data and the associated properties of the grant, such as numerology, ref ability, etc.). In an example, a WTRU may select a grant with shorter TTI, for example, when the data to be retransmitted may have strict timing requirements. An association may be based on a logical channel or highest priority logical channel of the data in the transport block to be retransmitted.

A WTRU may perform one or more procedures for failure of an eRAR procedure, for example, based on one or more of the following: (i) failure to receive eRAR following a maximum number of eMSG1 retransmissions and/or (ii) one or more failure conditions associated with NACK.

A WTRU may (e.g. upon failure of an eRAR procedure) perform one or more of the following: (i) declare Radio Link Failure (RLF); (ii) perform cell reselection; (iii) revert to normal RACH procedure (e.g. WTRU may transmit preamble according to rules associated with RACH (4-step) procedure); (iv) transmit data on contention-based resources and/or (v) perform backoff for a fixed or configured period of time before retrying the eRAR procedure.

An eRACH completion procedure may be provided, e.g., upon successful transmission. A WTRU may determine its data transmission during a preamble+data transmission was successful (e.g. successfully decoded by the network), for example, upon reception of an eRAR with HARQ A/N set to ACK. A WTRU may (upon successful transmission) perform one or more of the following actions.

A WTRU (e.g. upon successful transmission) may, for example, reset its TA timer and assume it is currently timing aligned for future UL transmissions.

A WTRU (e.g. upon successful transmission) may, for example, determine whether a UL grant was provided in the eRAR.

A WTRU may, for example, when a UL grant is provided in the eRAR, perform one or more of the following: (i) use the UL grant to perform transmission of any additional pending data for UL transmissions; (ii) use the UL grant to perform transmission of control information (e.g. buffer status or additional scheduling requests) and/or (iii) use the UL grant to perform transmission of information related to state transition (e.g. RRC Connection Request).

A WTRU may, for example, when a UL grant is not provided in the eRAR and the WTRU still has data to transmit in its buffers, perform one or more of the following: (i) send a scheduling request or buffer status information assuming UL timing alignment and/or (ii) perform a 2-step procedure with a different guard period configuration (e.g. no guard period).

A WTRU may, for example, when a UL grant is not provided in the eRAR and the WTRU does not have data to transmit, perform one or more of the following: (i) perform DRX and/or (ii) perform a state transition, such as to IDLE or light connected state.

Systems, methods, and instrumentalities (e.g. in a wireless transmit/receive unit (WTRU) and/or network layers L1, L2, L3) have been disclosed for random access in next generation wireless systems. A two-step random access procedure may permit a WTRU to select a preamble sequence (e.g. based on its desired data transmission). A WTRU may select data transmission resources, MCS and numerology associated with the preamble. A WTRU may transmit a preamble in the preamble resources and data in the data resources (e.g. resources may be joint or disjointed). A WTRU may receive an enhanced random access response (eRAR), which may include HARQ feedback. Procedures may be provided for an enhanced message 0 (eMSG0), e.g., network order, and related procedures, selection of an enhanced random access channel (eRACH) versus RACH, eMSG1 (e.g. preamble+ data transmission) and related procedures, eRAR and related procedures, hybrid automatic repeat request (HARQ) and retransmission related procedures for the data part of a transmission and contention-based resolution procedures. A network may provide a WTRU with a (e.g. per) bearer configuration for an eRACH procedure (e.g. while in an inactive state). New/dedicated bearers may be provided for WTRU transmission (e.g. while in an inactive state).

A scheduling request (SR) procedure may be performed using RACH, eRACH or dedicated SR. A WTRU may perform an SR procedure using a random access procedure, using the eRACH procedure, e.g. by including a BSR and/or data in the MSG1 transmission, or using a dedicated resource e.g. D-SR.

The WTRU may initiate a scheduling request. Such a scheduling request may be performed using a dedicated resource, e.g. if configured for the WTRU. For example, a D-SR may be sent using a transmission on a PUCCH resource or similar. Such scheduling request may be performed using a shared, possibly contentious, resource such as a RA-SR via a random access procedure using a transmission on PRACH or similar. Such scheduling request may be performed using a shared, possibly contentious, resource such as an eRA-SR using an enhanced random access procedure using a transmission on PRACH or similar, as described herein. For example, an MSG1 may be included the concerned data, e.g. the data that triggered the use and/or request of transmission resources.

For example, the WTRU may initiate a scheduling request when new data becomes available for transmission. Such data may be associated with one or more QoS parameters such as a maximum delay budget, a discard timer, a maximum time until successful transmission and/or the like. For example, data associated to an ultra-low latency service (or the like), to a discard function and/or to a specific radio bearer may no longer be useful or relevant for transmission after a certain amount of time. The amount of time may be preconfigured or dynamically configured. Such time may correspond to the time elapsed from the moment the WTRU determines that the data is available for transmission.

The WTRU may initiate a scheduling request for data available for transmission. The WTRU may determine that the maximum time requirement has elapsed or may determine that the maximum time requirement will elapse before the next occurrence of a resource available for performing a scheduling request. The WTRU may perform such a determination for a subset of scheduling request procedure types (e.g. D-SR if configured, and/or RA-SR otherwise) or at types of scheduling request procedures. The WTRU may perform such determination considering one or more additional access methods including, but not limited to, transmission of data using a grant free resource, a contentious resource and/or using a listen-before-talk (LBT) access in an unlicensed spectrum or the like, if such is configured and/or available for the concerned data. The WTRU may abort an ongoing scheduling request (or another type of access) and/or discard the concerned data. The WTRU may indicate to RLC that the corresponding RLC PDU is not to be retransmitted by the RLC, e.g., if such retransmission may be otherwise applicable (e.g. for a bearer configured with RLC AM).

The WTRU may interrupt the transmission of such data after it has been included in a transport block and after a first HARQ transmission has been performed for this transport block. For example, the transmission may be initiated using a MSG1 in the eRACH procedure. For example, the transmission may be initiated using a resource granted by the network, e.g. a semi-persistently allocated resource, a dynamically assigned resource by DCI reception, and/or using a grantless transmission procedure such as a contention-based access for a PUSCH resource (CB-PUSCH). For example, the interruption of the transmission of such data may be network controlled. The WTRU may receive downlink control signaling for a HARQ process that indicates that a new transmission may be performed for the associated HARQ process, e.g. a DCI that toggles a NDI for the corresponding HARQ process. The WTRU may autonomously interrupt the transmission of such data, based on a determination that the WTRU may use a grant free resource or a contentious resource. For example, the WTRU may determine that the next occurrence of an unscheduled resource is after time has elapsed for the concerned data. For example, the WTRU may determine that an access to resources e.g. using an LBT access in an unlicensed spectrum or the like, exceeds the maximum time requirement for the concerned data. For example, the WTRU may determine that an access to resources e.g. using an LBT access in an unlicensed spectrum or the like, is likely to exceed the maximum time requirement for the concerned data. Upon such a determination, the WTRU may abort an ongoing HARQ process and/or discard the concerned data. The WTRU may indicate to RLC that the corresponding RLC PDU is not to be retransmitted by the RLC, e.g., if such retransmission may be otherwise applicable (e.g. for a bearer configured with RLC AM).

The WTRU may determine that data is no longer available for transmission. For example, the concerned data may be considered unavailable for transmission on a condition that the time elapsed since the WTRU first determined that the concerned data became available for transmission exceeds a maximum amount of time. The WTRU may cancel the scheduling request (and/or the buffer status report). In an embodiment, the WTRU may cancel a scheduling request related to the concerned data. In an embodiment, the WTRU may cancel the scheduling request on a condition that the WTRU has not performed an initial transmission of a TB for the concerned data. Otherwise, the WTRU may suspend and/or abort the HARQ process for the concerned TB.

The network may not have been aware of the data becoming available for transmission. In some cases, the network may be unable to determine that the WTRU has discarded the concerned data. The network may be unable to determine that the WTRU has cancelled a scheduling request and/or that it has interrupted (or aborted) a transmission autonomously (e.g. in the case where the WTRU attempted a transmission using unscheduled, possibly shared, resources or in the case of LBT). The discarding of data may be hidden to the network as a result of the latency of the access attempt of the WTRU. Such events may occur due to deteriorating radio conditions, sub-optimal link adaptation, radio link failure, congestion (e.g. for shared and/or contentious resources), failure to receive a RAR for RA-SR within a sufficiently short time, load in the cell or a mismatch in the configuration of the WTRU for the concerned service.

The WTRU may notify the network of the data becoming unavailable for transmission. The WTRU may determine that an uplink notification to the network is to be initiated. The WTRU may perform at least one of the following.

The WTRU may trigger the transmission of a MAC CE. The MAC CE may indicate the discard of the data, the interruption of a scheduling request and/or the interruption of an ongoing HARQ transmission (e.g. in case of a grantless or LBT operation). The MAC CE may be an extended version of a BSR, e.g. that includes an indication of discarded data per LCH and/or LCG. The MAC CE may be included in the next transmission for the concerned MAC instance. A new scheduling request may be triggered.

The WTRU may trigger the transmission of a status report, e.g. an RLC status report or the like. The report may indicate the discard of the data at the transmitter such that the receiver may ignore the "missing" RLC PDU. The status report may be generated as a stand-alone PDU (e.g. RLC PDU) or piggybacked on the next available RLC PDU for the concerned packet flow treatment (e.g. bearer). The PDU may be considered as new data available for transmission may trigger a new scheduling request.

The WTRU may trigger the transmission of a status report e.g. a PDCP SR (or similar). The status report may indicate the discard of the data. The status report may be generated as a stand-alone PDU (e.g. PDCP PDU) or piggybacked on the next available PDU for the concerned packet flow treatment (e.g. bearer). The PDU may be considered as new data available for transmission may trigger a new scheduling request.

The WTRU may initiate an L3/RRC reporting procedure. For example, the WTRU may initiate the transmission of a bearer-specific (or QoS treatment-specific) RRC radio link failure notification or the like. The notification may indicate the discard of the data, the concerned bearer, cause and/or QoS flow identity. The message may be generated as a stand-alone PDU (e.g. RRC PDU). The PDU may be considered as new data available for transmission may trigger a new scheduling request.

The uplink notification may be subject to a prohibit function. For example, a supervision function may be applied such that no more than x (e.g. x=1) of the above notification may be sent within a (e.g. configured) period of time. A notification prohibit timer may be started, e.g. when a notification is first available for transmission. The WTRU may refrain from generating any additional notification (e.g., only for the same cause, if applicable) while the timer is running.

For example, the WTRU may subsequently receive a RRC connection reconfiguration as a corrective action as a response from the network.

The WTRU may perform the following as a function of the type of interruption.

For dedicated SR (D-SR) interruption, the WTRU may determine that the WTRU may not use the associated set of resources, e.g. resources corresponding to a URLLC service if such resources have been used for the interrupted D-SR procedure. The WTRU may determine to use a legacy RACH, e.g., using resources selected as a function of the type of notification. For example, the WTRU may use resources corresponding to a default access and/or to a specific, e.g. longer, TTI duration.

For eRACH interruption with data-only or a BSR in MSG1, the WTRU may delay using the eRACH procedure, e.g. until the WTRU determines that an uplink notification related to the concerned procedure has been successfully received by the network (e.g. HARQ ACK is received for the concerned transmission) and/or until the WTRU first receives an L3 reconfiguration message. The WTRU may determine an access procedure to use e.g. a D-SR or legacy RACH, e.g., using resources selected as a function of the type of notification. For example, the WTRU may use resources corresponding to a default access and/or to a specific, e.g. longer, TTI duration.

For random access interruption, the WTRU may determine not to use the associated set of resources e.g. resources corresponding to a URLLC service if such resources have been used for the interrupted RA-SR procedure. The WTRU may determine to use a legacy RACH. For example, the WTRU may determine to use a legacy RACH only if resources different than those used for the interrupted RA-SR procedure are available.

Figure 8:
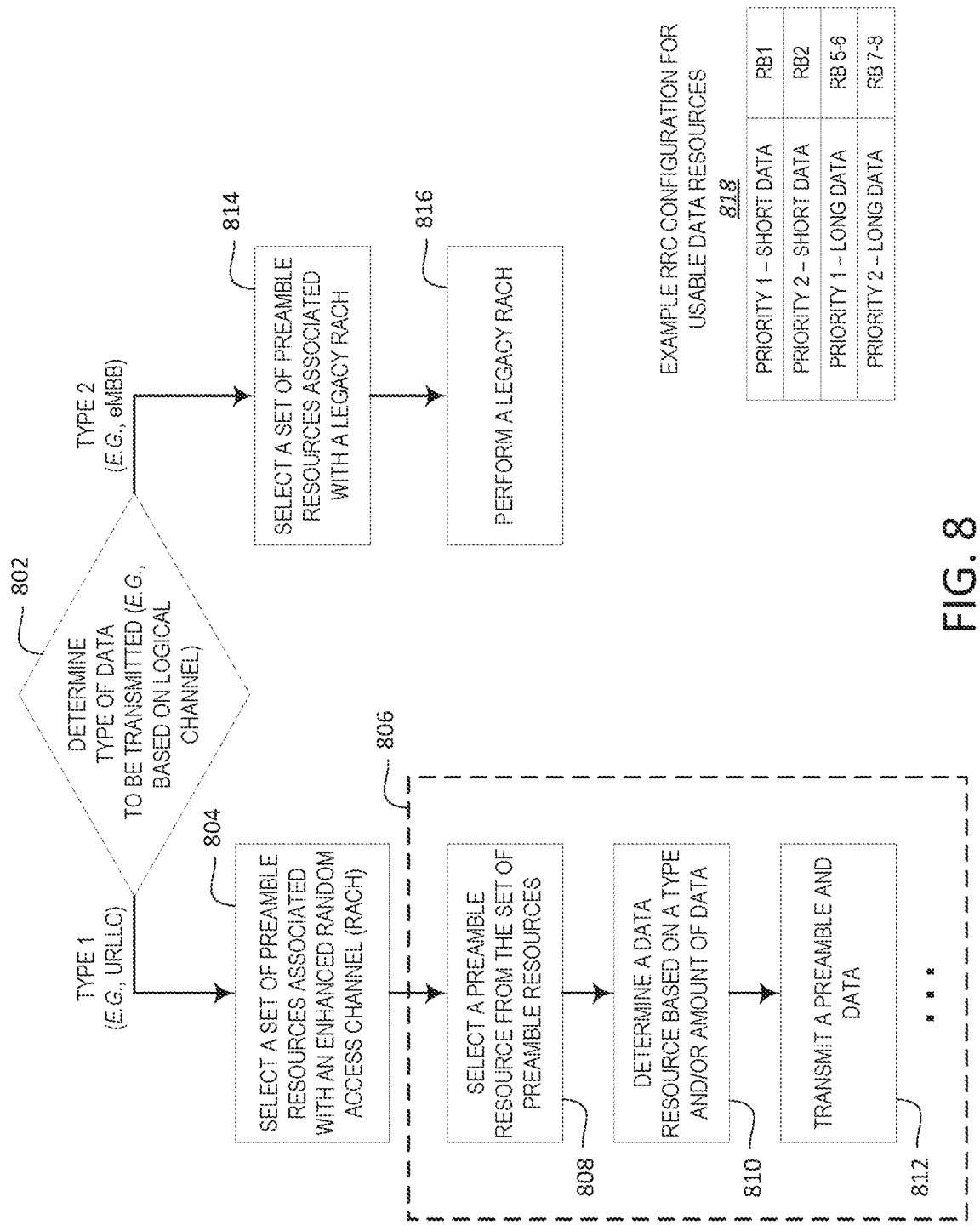
FIG. 8 is an example flow chart of determining whether to perform an eRACH procedure or a legacy RACH procedure.

FIG. 8 is an example flow chart of a WTRU determining whether to perform an eRACH procedure or a legacy RACH procedure. A WTRU may initiate a random access request. The WTRU may initiate the random access request to perform a scheduling request and/or transmit an amount of data that is below a predetermined threshold. At 802, the WTRU may determine whether to select a first random access channel (RACH) procedure or a second RACH procedure for the random access. The first RACH procedure may be a legacy RACH procedure. The second RACH procedure may be an enhanced RACH (eRACH) procedure. At 802, the WTRU may determine whether to select the first RACH procedure or the second RACH procedure based on a type of uplink data to be transmitted and/or the purpose of the random access request. For example, as shown in FIG. 8, the WTRU may select the legacy RACH procedure for type 2 data. Type 2 data may include enhanced mobile broadband (eMBB) data, for example. As another example, the WTRU may select the eRACH procedure for type 1 data. Type 1 data may include ultra-reliable and low latency communications (URLLC) data, for example.

When the eRACH procedure is selected, the WTRU may perform one or more of the following. At 804, the WTRU may select a set of preamble resources. The set of preamble resources may be associated with an eRACH. The WTRU may perform an eRACH procedure 806. The eRACH procedure 806 may be a two-step RACH procedure. At 808, the WTRU may select a preamble resource from the set of preamble resources (e.g., selected at 804). The preamble resource may be a physical random access channel (PRACH) resource, for example, associated with the eRACH procedure. The preamble resource may be an enhanced PRACH (ePRACH) resource. The preamble resource may include one or more of the preamble sequence, a time-frequency resource, and/or a numerology. The WTRU may determine a preamble sequence associated with the second RACH procedure. The preamble sequence may be determined based on one or more of the preamble resource, a data reception reliability, an amount of data to be transmitted, a maximum transport block size, a range of allowable transport block sizes, a type of the RACH transmission, a trigger associated with the RACH transmission, a timing requirement, a buffer status, a WTRU identity, a location, a numerology, a modulation and coding scheme (MCS), a demodulation configuration, and/or multiple preambles received from the network device.

At 810, the WTRU may determine a data resource for the uplink data based on one or more of the preamble resource, the preamble sequence, the type of uplink data, or a size of the uplink data. The data resource may be determined from a set of available resources. The set of available resources may be indicated via one or more of system information, an access table, or a physical data control channel (PDCCH) grant to a specific radio network identifier (RNTI).

At 812, the WTRU may send a RACH transmission to a network device using the at least one PRACH resource and/or the data resource. The RACH transmission may include the preamble sequence and/or the uplink data. The preamble sequence and the uplink data may be disjoint in time and/or frequency. The preamble sequence may be prepended to the uplink data. The WTRU may receive a random access response (RAR) message that includes an acknowledgment (ACK) or a negative acknowledgment (NACK) associated with the uplink data in the RACH transmission. The RAR message may include an uplink grant. The WTRU may transmit additional pending uplink data, control information, and/or state transition information to the network device based on the uplink grant.

When the legacy RACH procedure is selected, the WTRU may perform one or more of the following. At 814, the WTRU may select a set of preamble resources that may be associated with a legacy RACH. At 816, the WTRU may perform a legacy RACH.

Example RRC configurations 818 for usable data resources may include priority 1—short data, priority 2—short data, priority 1—long data, or priority 2—long data. A first resource block (e.g., RB1) may be used for priority 1, short data. A second resource block (e.g., RB2) may be used for priority 2, short data. A third and/or fourth resource block(s) (e.g., RB 5-6) may be used for priority 1, long data. A fifth and/or sixth resource block(s) (e.g., RB 7-8) may be used for priority 2, long data.

The processes and instrumentalities described herein may apply in any combination, may apply to other wireless technologies, and for other services.

A WTRU may refer to an identity of the physical device, or to the user's identity such as subscription related identities, e.g., MSISDN, SIP URI, etc. WTRU may refer to application-based identities, e.g., user names that may be used per application.

The processes described above may be implemented in a computer program, software, and/or firmware incorporated in a computer-readable medium for execution by a computer and/or processor. Examples of computer-readable media include, but are not limited to, electronic signals (transmitted over wired and/or wireless connections) and/or computer-readable storage media. Examples of computer-readable storage media include, but are not limited to, a read only memory (ROM), a random access memory (RAM), a register, cache memory, semiconductor memory devices, magnetic media such as, but not limited to, internal hard disks and removable disks, magneto-optical media, and/or optical media such as CD-ROM disks, and/or digital versatile disks (DVDs). A processor in association with software may be used to implement a radio frequency transceiver for use in a WTRU, terminal, base station, RNC, and/or any host computer.

What is claimed:

1. A wireless transmit/receive unit (WTRU) comprising:
a processor configured to:
initiate a random access;
determine whether to select; for the random access, a first random access channel (RACH) procedure or a second RACH procedure based at least on a network configuration;
under a condition that the second RACH procedure is selected, the processor being further configured to:
determine at least one physical random access channel (PRACH) resource associated with the second RACH procedure;
determine a preamble associated with the second RACH procedure, based at least on higher layer information including information related to preamble sequence;
determine preamble resource associated with the second RACH procedure based at least on higher layer information;
determine a data resource for the uplink data based on one or more of the at least one PRACH resource, the preamble sequence, a type of uplink data, or a size of the uplink data; and
send, to a network device using the at least one PRACH resource and the data resource, a RACH transmission that comprises the preamble sequence and the uplink data.

2. The WTRU of claim 1, wherein the processor is further configured to receive a random access response (PAR) message that comprises an acknowledgment (ACK) or a negative acknowledgment (NACK) associated with the uplink data in the RACH transmission.

3. The WTRU of claim 2, wherein the RAR, message comprises an uplink grant, the processor further configured to transmit, to the network device based on the uplink grant, one or more of additional pending uplink data, control information, or state transition information.

4. The WTRU of claim 1, wherein the second RACH procedure is an enhanced RACH procedure and the PRACH resource is an enhanced PRACH resource.

5. The WTRU of claim 1, wherein the preamble sequence and the uplink data in the RACH transmission are disjoint in one or more of time or frequency.

6. The WTRU of claim 1, wherein the preamble sequence is prepended to the uplink data in the RACH transmission.

7. The WTRU of claim 1, wherein the processor is further configured to initiate the random access to perform a scheduling request or transmit an amount of data that is below a predetermined threshold.

8. The WTRU of claim 1, wherein the data resource is determined from a set of available resources indicated via one or more of system information, an access table, or a physical data control channel (PDCCH) grant to a specific radio network identifier (RNTI).

9. The WTRU of claim 1, wherein the PRACH resource comprises the preamble sequence, a time-frequency resource, or a numerology.

10. A method of data transmission, the method comprising:
- initiating a random access;
- determining whether to select, for the random access, a first random access channel (RACH) procedure or a second RACH procedure based at least on a network configuration;
- under a condition that the second RACH procedure is selected, the method further comprising:
- determining at least one physical random access channel (PRACH) resource associated with the second RACH procedure;
- determining a preamble associated with the second RACH procedure, based at least on higher layer information including information related to preamble sequence;
- determining preamble resource associated with the second RACH procedure based at least on higher layer information;
- determining a data resource for the uplink data based on one or more of the at least one PRACH resource, the preamble sequence, a type of uplink data, or a size of the uplink data; and
- sending, to a network device using the at least one PRACH resource and the data resource, a RACH transmission that comprises the preamble sequence and the uplink data.

11. The method of claim 10, further comprising receiving a random access response (RAR) message that comprises an acknowledgment (ACK) or a negative acknowledgment (NACK) associated with the uplink data in the RACH transmission.

12. The method of claim 11, wherein the RAR message comprises an uplink grant, the method further comprising transmitting, to the network device based on the uplink grant, one or more of additional pending uplink data, control information, or state transition information.

13. The method of claim 10, wherein the second RACH procedure is an enhanced RACH procedure and the PRACH resource is an enhanced PRACH resource.

14. The method of claim 10, wherein the preamble sequence and the uplink data in the RACH transmission are disjoint in one or more of time or frequency.

15. The method of claim 10, wherein the preamble sequence is prepended to the uplink data in the RACH transmission.

16. The method of claim 10, further comprising initiating the random access to perform a scheduling request or transmit an amount of data that is below a predetermined threshold.

17. The method of claim 10, wherein the data resource is determined from a set of available resources indicated via one or more of system information, an access table, or a physical data control channel (PDCCH) grant to a specific radio network identifier (RNTI).

18. The method of claim 10, wherein the PRACH resource comprises the preamble sequence, a time-frequency resource, or a numerology.

19. A network device comprising:
- a processor configured to receive a RACH transmission, using at one least physical random access channel (PRACH) resource and a data resource, that RACH transmission comprises a preamble sequence and uplink data,
- wherein a first random access channel (RACH) procedure or a second RACH procedure is selected by a WTRU based at least on a network configuration, and under a condition that the second RACH procedure is selected, the at least one PRACH resource associated with the second RACH procedure is determined, a preamble associated with the second RACH procedure is determined based at least on higher layer information including information related to preamble sequence, a preamble resource associated with the second RACH procedure is determined based at least on higher layer information, and the data resource for the uplink data is determined based on one or more of the at least one PRACH resource, the preamble sequence, a type of uplink data, or a size of the uplink data.

20. A data communication method comprising:
- receiving, by a processor of a network device, a RACH transmission, using at one least physical random access channel (PRACH) resource and a data resource, that RACH transmission comprises a preamble sequence and uplink data,
- wherein a first random access channel (RACH) procedure or a second RACH procedure is selected by a WTRU based at least on a network configuration, and under a condition that the second RACH procedure is selected, the at least one PRACH resource associated with the second RACH procedure is determined, a preamble associated with the second RACH procedure is determined based at least on higher layer information including information related to preamble sequence, a preamble resource associated with the second RACH procedure is determined based at least on higher layer information, and the data resource for the uplink data is determined based on one or more of the at least one PRACH resource, the preamble sequence, a type of uplink data, or a size of the uplink data.

* * * * *